United States Patent
Ki

(10) Patent No.: US 10,489,197 B2
(45) Date of Patent: Nov. 26, 2019

(54) HIGHLY EFFICIENT INEXACT COMPUTING STORAGE DEVICE

(71) Applicant: Samsung Electronics Co., Ltd., Suwon-si, Gyeonggi-do (KR)

(72) Inventor: Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 129 days.

(21) Appl. No.: 15/728,492

(22) Filed: Oct. 9, 2017

(65) Prior Publication Data

US 2018/0032381 A1    Feb. 1, 2018

Related U.S. Application Data

(63) Continuation-in-part of application No. 14/838,351, filed on Aug. 27, 2015, now Pat. No. 9,811,379.

(60) Provisional application No. 62/169,550, filed on Jun. 1, 2015.

(51) Int. Cl.
| | |
|---|---|
| *G06F 9/48* | (2006.01) |
| *G06F 9/50* | (2006.01) |
| *G06F 9/30* | (2018.01) |
| *G06F 1/329* | (2019.01) |
| *G06F 1/3228* | (2019.01) |
| *G06F 9/38* | (2018.01) |

(52) U.S. Cl.
CPC ............... *G06F 9/50* (2013.01); *G06F 1/329* (2013.01); *G06F 1/3228* (2013.01); *G06F 9/3001* (2013.01); *G06F 9/30014* (2013.01); *G06F 9/3836* (2013.01); *G06F 9/48* (2013.01); *G06F 9/4806* (2013.01); *G06F 9/4843* (2013.01); *G06F 9/4881* (2013.01); *G06F 9/4893* (2013.01); *G06F 9/5005* (2013.01); *G06F 9/5027* (2013.01); *G06F 9/5038* (2013.01); *G06F 9/5083* (2013.01); *G06F 9/5094* (2013.01); *G06F 9/3004* (2013.01); *Y02D 10/24* (2018.01)

(58) Field of Classification Search
CPC ........ G06F 9/48; G06F 9/4806; G06F 9/4843; G06F 9/4881; G06F 9/4893; G06F 9/50; G06F 9/5005; G06F 9/5027; G06F 9/5038; G06F 9/5094
See application file for complete search history.

(56) References Cited

U.S. PATENT DOCUMENTS

| | | | |
|---|---|---|---|
| 6,959,316 | B2 | 10/2005 | Parviainen |
| 8,375,180 | B2 | 2/2013 | Chiu et al. |
| 8,819,335 | B1 | 8/2014 | Salessi et al. |
| 2003/0053717 | A1 | 3/2003 | Akhan et al. |
| 2007/0112723 | A1 | 5/2007 | Alvarez et al. |
| 2008/0201716 | A1* | 8/2008 | Du ............... G06F 9/30145 718/104 |

(Continued)

*Primary Examiner* — Charles M Swift
(74) *Attorney, Agent, or Firm* — Renaissance IP Law Group LLP

(57) ABSTRACT

An adaptive mechanism may include a receiver, an Arithmetic Logic Unit (ALU) identifier, and an assignment module. The receiver may receive tasks representing iterations of inexact algorithms. Each task may have a corresponding iteration power level. The ALU identifier may identify a set of available ALUs. Each ALU may have a corresponding ALU power level. The assignment module may assign tasks to available ALUs to optimize a total ALU power used.

20 Claims, 29 Drawing Sheets

(56) References Cited

U.S. PATENT DOCUMENTS

| | | | |
|---|---|---|---|
| 2008/0235316 A1* | 9/2008 | Du | G06T 15/005 |
| | | | 708/513 |
| 2009/0265528 A1* | 10/2009 | Du | G06F 8/47 |
| | | | 712/220 |
| 2012/0005683 A1* | 1/2012 | Bower, III | G06F 9/5094 |
| | | | 718/103 |
| 2012/0039539 A1 | 2/2012 | Boiman et al. | |
| 2013/0263142 A1 | 10/2013 | Miyamae | |
| 2014/0122546 A1 | 5/2014 | Liao et al. | |
| 2015/0135182 A1* | 5/2015 | Liland | G06F 9/3867 |
| | | | 718/102 |

* cited by examiner

815

| Lookup Table | | |
|---|---|---|
| Location | ALU ID | Accuracy |
| C1 _903_ | ALU1 _906_ | 32 _909_ |
| C1 _903_ | ALU2 _912_ | 32 _915_ |
| C1 _903_ | ALU3 _918_ | 64 _921_ |
| C1 _903_ | GPGPU1 _924_ | 64 _927_ |
| C2 _930_ | ALU4 _933_ | 32 _936_ |
| C2 _930_ | ALU5 _939_ | 64 _942_ |
| C2 _930_ | ALU6 _945_ | 128 _948_ |
| C2 _930_ | GPGPU2 _951_ | 128 _954_ |
| D1 _957_ | ALU7 _960_ | 64 (conf.) _963_ |
| ⋮ | ⋮ | ⋮ |

FIG. 9

HIGHLY EFFICIENT INEXACT COMPUTING STORAGE DEVICE

RELATED APPLICATION DATA

This application is a continuation-in-part of U.S. patent application Ser. No. 14/838,351, filed Aug. 27, 2015, now allowed, which claims the benefit of U.S. Provisional Patent Application Ser. No. 62/169,550, filed Jun. 1, 2015, both of which are hereby incorporated by reference for all purposes.

FIELD

The inventive concept pertains to computing, and more particularly to using inexact computing to improve computing performance.

BACKGROUND

Distributed cluster computing frameworks are popular to cope with ever-increasing Big Data in the modern computing era. Hadoop and Spark, for example, are quickly growing, and many internet-service companies such as Google, Facebook, Amazon, and the like are considering these cluster computing platforms as their platforms of choice to solve their many Machine Learning problems.

In addition, new startups, such as Palantir, provide such platforms and analytical applications as services. The keys to succeed in this business are competitive response times in providing services with high energy efficiency, because energy costs for data centers are substantial. As such, eliminating wasteful processes in computing is crucial.

Modern Big Data machine learning algorithms heavily rely on fast iterative methods. Conceptually, fast iterative methods provide not only a simple and fast converging framework, but also appeal to a data-centric philosophy. "Data-centric" means (generally) that analyzing more data with dumber algorithms is better than analyzing less data with stronger algorithms. Such an approach is well aligned to Big-Data analytics. That is, with ever-increasing data, it is important to cope with such large scale data in a reasonable amount time by sacrificing some degree of accuracy. In this context, fast iterative methods have become popular.

Such fast iterative methods come with two commonalities. First, as the number of iterations of the algorithm increases, a solution matures. For example, Coordinate Descent (CD) repeats search steps with finer granularity in its delta values in directions and search steps. Second, parallel solvers are often useful. Because of random and divergent nature of fast iterative methods, there are many variants that adopt parallel search techniques to enhance convergence speed and prune sub-optimal or divergent cases. These common characteristics may result in huge performance losses and energy wasted because the hardware or system frameworks work towards the best accuracy not knowing the end-use requirements. For example, commonly 64-bit Arithmetic Logic Units (ALUs) and/or 128-bit ALUs are used throughout the entire application to find a solution even for some processes that only require 32-bit or lower bit ALUs. Software solutions, such as GNU Multiple Precision (GMP) Arithmetic library and the NYU Core Library, may improve the precision beyond 128 bits, limited only by available memory. But using greater precision than is needed by the iteration of the algorithm is wasteful of resources and slow to process.

A need remains for a way to improve the performance of fast, inexact solution methods.

BRIEF DESCRIPTION OF THE DRAWINGS

FIG. 9 shows details of the lookup table of FIG. 8.

DETAILED DESCRIPTION

Figure 1:
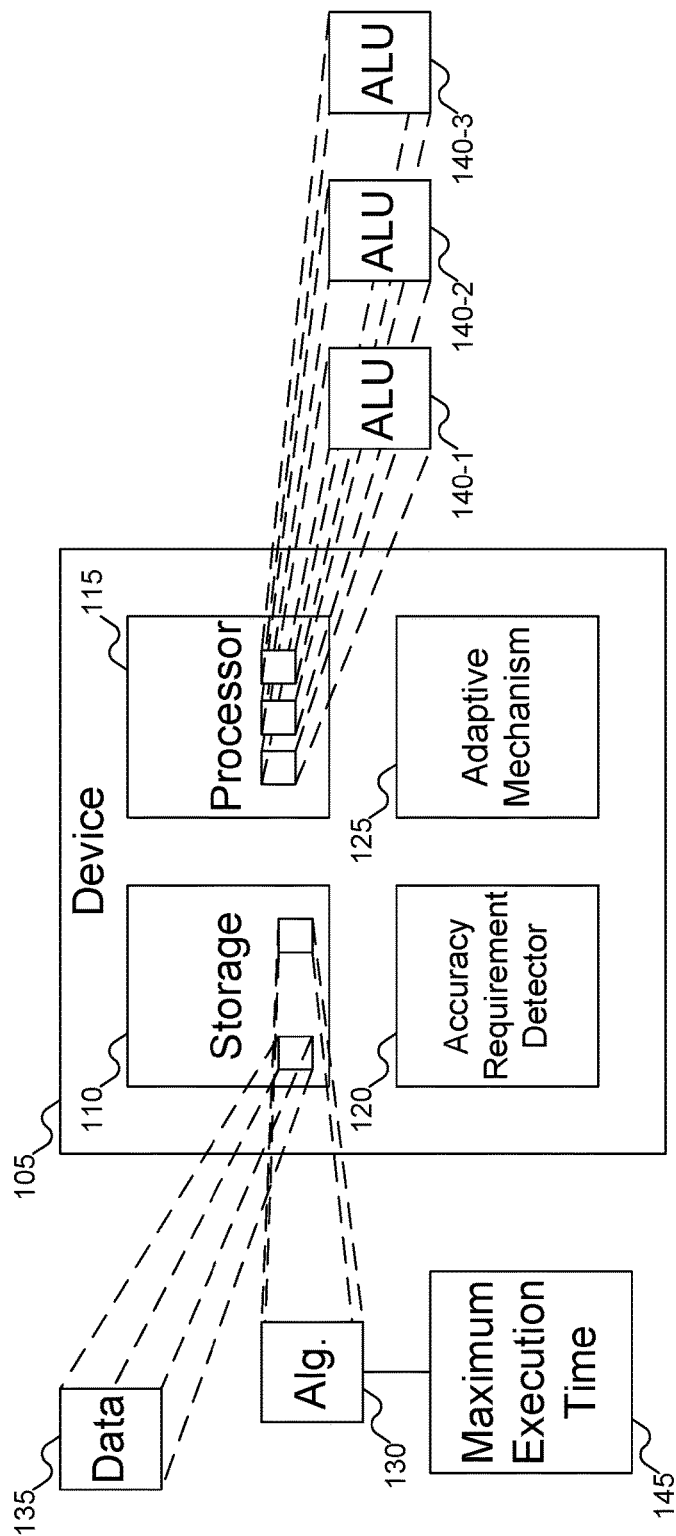
FIG. 1 shows a device enabling the use of variable accuracy computing to solve a fast, inexact algorithm, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Machine learning algorithms are widely used in Big Data analytics. In many cases, these algorithms involve the problem of minimizing an object function that has the form of a sum. The summand functions have a simple form that enables inexpensive evaluations of the sum-function and the sum gradient. Most of these "estimation" functions are very useful in modern computing platforms because such functions enable fast iterative methods; however they are inexact, rather than slow and exact. While being bounded by rigorous mathematical proof, fast iterative methods are critical to provide faster services, quicker business decisions, and better time-to-market.

Coordinate Descent (CD), for example, is a well-known non-derivative optimization method to find a local minimum of a function. While there are many variants of CD, one common observation is that the accuracy requirement for a solution increases as the iteration count increases. Unfortunately, modern computing execution frameworks are not aware of this tradeoff, and waste their computing power and increase their latency to achieve maximum resolutions. The early iterations of such an algorithm might not require the full capacity of the available hardware resources and/or software-supported precision, but later stage might require them. This may be understood from a software perspective, for example, using MapReduce.

It would be both faster and more energy efficient if a computing device may be made aware of the accuracy requirements per iteration, and adaptively change their computing accuracy or assign different Arithmetic Logic Units (ALUs) to the operation.

Accuracy-requirement aware inexact computing mechanisms may be used for machine learning frameworks. This mechanism may, for example, detect a delta (difference between iterations), then assign computation work to an ALU that is appropriate to the accuracy required by that iteration. Example destination ALUs may include Smart Solid State Devices (SSDs), which are capable of performing in-storage computing operations, host CPUs, networked CPUs, General-Purpose computing on Graphics Processing Units (GPGPUs), and configurable ALUs, among other possibilities.

An accuracy-requirement aware inexact computing mechanism may take the accuracy requirements as an input, and output an offloading ratio and/or job assignments to various ALUs. The output may be determined dynamically by considering the energy efficiencies of different/configurable ALUs. The maturity of the solution for the iteration may be dynamically determined by calculating delta values, iteration counts, and a user's specification, (e.g. a time limit along with an acceptable probability/error).

An accuracy-requirement aware inexact computing mechanism may include an accuracy-requirement detector, a scheduler and a mapper. The accuracy requirement detector may be a delta comparator detecting the difference between solutions of two adjacent steps or a first few evaluations. The output of the accuracy detector may be a required accuracy in terms of bits for integer operation and floating point operations. The mapper may determine the system configurations and accuracy requirements, generating mappings of operations and resources. Finally the scheduler may efficiently scheduling tasks to maximize energy efficiency with fast execution via proper device parallelism and near data processing.

In contrast with prior art computing models, in which all computation is executed on the host CPU using maximum accuracy available, embodiments of the inventive concept may enable using ALUs with lower accuracy (inexact computing). Embodiments of the inventive concept may achieve inexact computing by, among other possibilities, utilizing a reduced number of bits with configurable ALUs and/or less accurate ALUs, among all ALUs available (including in-storage computing, host ALUs, networked, ALUs, host GPGPUs, and networked GPGPUs, among other possibilities). By using ALUs with different accuracies for different iterations of the algorithm, embodiments of the inventive concept may optimize the performance of the system. In essence, embodiments of the inventive concept are self-configuring according to the needs of the algorithm.

Embodiments of the inventive concept may also enable fast-forwarding of search algorithms with early pruning. Such mechanisms accelerate the search rate or learning rate by utilizing energy efficient ALUs with faster latency (due to lower accuracy), on top of faster data transfer bandwidths available inside the storage units. As such, whole search algorithms may be accelerated. In addition, parallel path solving with pruning may be also be achieved, either utilizing multiple Storage Processing Units (SPUs) inside storage devices, or utilizing many cores inside GPGPUs.

Embodiments of the inventive concept may also include a scheduler comprised of configurable/heterogeneous ALUs awareness, an accuracy-requirement detector, and a mapper.

FIG. 1 shows a device enabling the use of variable accuracy computing to solve a fast, inexact algorithm, according to an embodiment of the inventive concept. In FIG. 1, device 105 is shown. The embodiment of the inventive concept shown in FIG. 1 describes device 105 as a smart SSD, but other embodiments of the inventive concept may include any device capable of supporting the described mechanism.

Device 105 may include storage 110, processor 115, accuracy requirement detector 120, and adaptive mechanism 125. Storage 110 may store information, such as algorithm 130 and data 135 (which may be used with algorithm 130). While FIG. 1 shows storage 110 as storing both algorithm 130 and data 135, embodiments of the inventive concept may separate where algorithm 130 and data 135 are stored. That is, algorithm 130 might be stored on a different device than data 135. Algorithm 130 may have an associated maximum execution time 145, which may represent a target maximum time used to execute algorithm 130. But as discussed below with reference to FIGS. 19-24B and 25-27, the execution time of algorithm 130 may be considered less important than the power consumed in performing iterations of algorithm 130, and therefore algorithm 130 may take longer than maximum execution time 145 to complete: that is, maximum execution time 145 may be considered a desirable objective, rather than a requirement. Processor 115 may be any desired processor, and may include one or more ALUs, such as ALUs 140-1, 140-2, and 140-3. While FIG. 1 shows three ALUs 140-1, 140-2, and 140-3, FIG. 1 is merely an example, any processor 115 may include any number of ALUs.

Accuracy requirement detector 120 may be used to determine the accuracy required by an iteration of algorithm 130. Accuracy requirement detector 120 is described further with reference to FIG. 2 below. Adaptive mechanism 125 may use the result of accuracy requirement detector 120 and information about algorithm 130 to determine which ALU to use for an iteration of algorithm 130.

Figure 2:
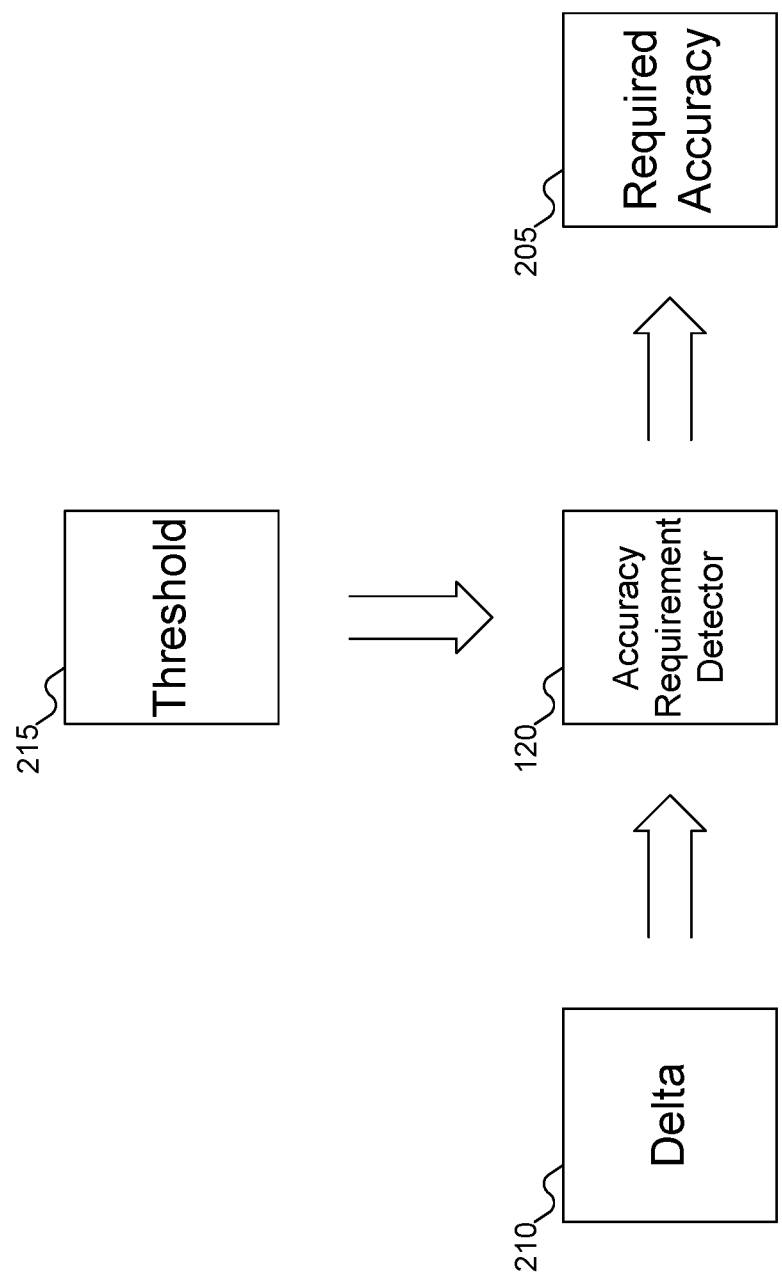
FIG. 2 shows the processor of FIG. 1 determining a required accuracy.
Figure 4:
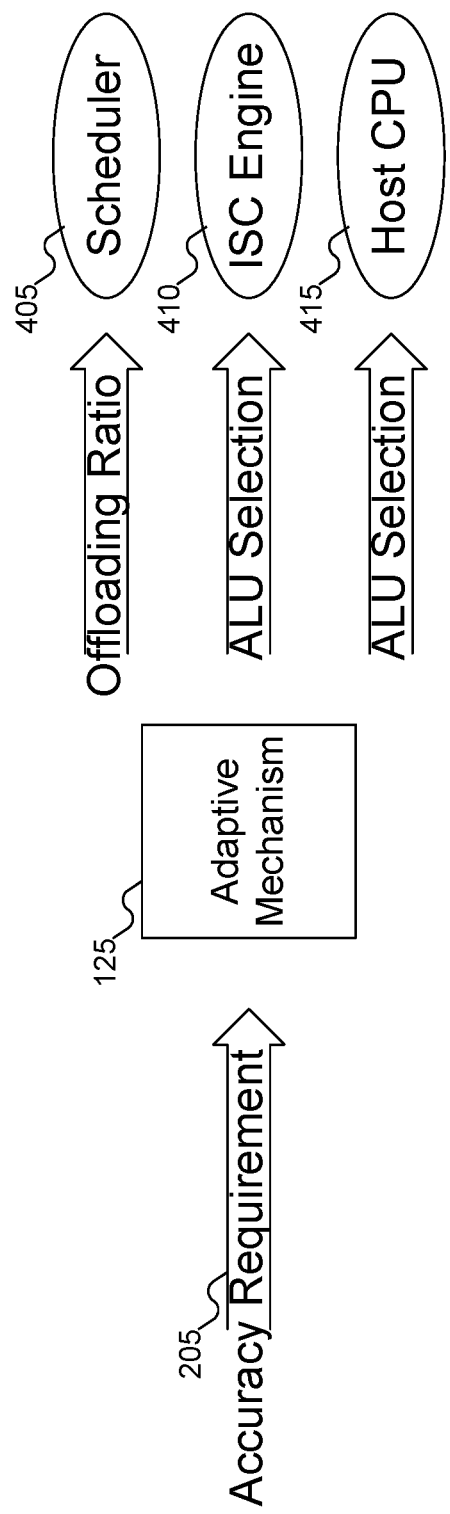
FIG. 4 shows the adaptive mechanism of FIG. 1 using the required accuracy of FIG. 2 to determine which Arithmetic Logic Unit(s) (ALU(s)) to use to solve a fast, inexact algorithm.

FIG. 2 shows accuracy requirement detector 120 of FIG. 1 determining required accuracy 205 (more details of which are shown in FIG. 4 below). In FIG. 2, accuracy requirement detector 120 may receive delta 210 and threshold 215. Delta 210 may be the difference in values as calculated between previous iterations of algorithm 130 of FIG. 1 (for example, between the immediately-preceding two iterations. Threshold 215 may be a threshold that may be used to determine whether to change the required accuracy. For example, the current accuracy required may be a 10-bit fractional part, and threshold 215 may be 0.005. If delta 210 is less than 0.005, then a 10-bit fractional part is insufficient accuracy, and accuracy requirement detector 120 may increase required accuracy 205: for example, to a 16-bit fractional part, or to a 23-bit fractional part. But if delta 210 is equal to or greater than 0.005, then a 10-bit fractional part remains sufficient and accuracy requirement 205 need not be changed.

While FIG. 2 shows only one threshold 215, embodiments of the inventive concept may include more than one threshold 215. Different thresholds may be used to trigger different levels of required accuracy 205. In this manner, embodiments of the inventive concept may use ALUs with varying levels of accuracy. For example, some ALUs may operate on 32-bit numbers, other ALUs may operate on 64-bit numbers, and still other ALUs may operate on 128-bit numbers. In addition, configurable ALUs (described further with reference to FIG. 11 below) may use varying levels of accuracy. Using multiple thresholds enables embodiments of the inventive concept to use these different ALUs more efficiently, as less accurate ALUs may be used when accuracy is less critical, and more accurate ALUs may be used when accuracy is more critical. Since there are often fewer ALUs that are more accurate, the demands on those ALUs are relatively greater. Utilizing less accurate ALUs reduces the amount of time an algorithm might have to wait for an available ALU. (This advantage is aside from the fact that less accurate ALUs may perform computations more quickly than more accurate ALUs, further reducing latency.)

Figure 3B:
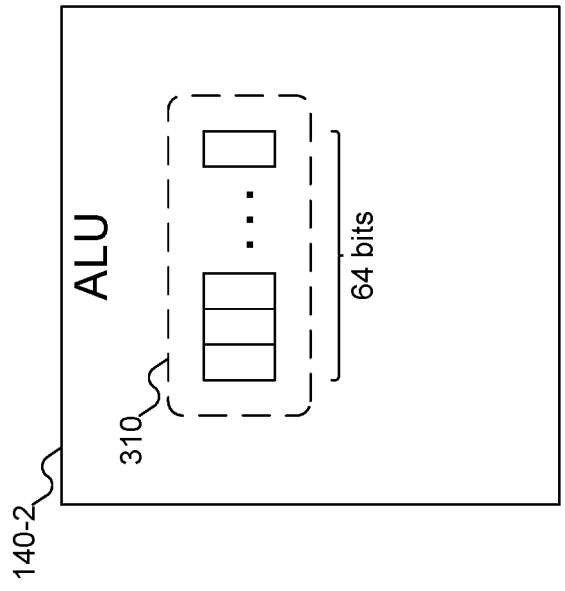
FIGS. 3A-3B show ALUs with different accuracies.
Figure 3A:
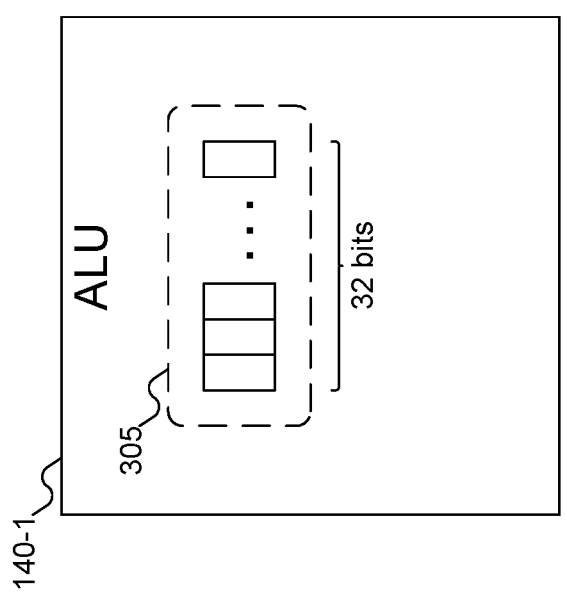

FIGS. 3A-3B show example ALUs with different accuracies. In FIG. 3A, ALU 140-1 is shown, with a 32-bit accuracy, as shown by number 305. In contrast, in FIG. 3B, ALU 140-2 is shown, with a 64-bit accuracy, as shown by number 310. Note that the ALUs themselves typically perform the same operations: the only difference for algorithmic scheduling purposes is the accuracy offered by the ALUs. ALU 140-2 of FIG. 3B is more accurate than ALU 140-1 of FIG. 3A, since ALU 140-2 uses more bits in computations.

Once accuracy requirement 205 has been determined, adaptive mechanism 125 of FIG. 1 may use accuracy requirement 205 to manage which ALUs perform iterations of algorithm 130 of FIG. 1. FIG. 4 shows adaptive mechanism 125 performing these operations in an example embodiment of the inventive concept. In FIG. 4, adaptive mechanism 125 receives accuracy requirement 205. Using accuracy requirement 205, along with information about what ALUs are available (described further with reference to FIGS. 8-9 below), adaptive mechanism 125 may inform scheduler 405 of an offloading ratio. Scheduler 405 may use the offloading ratio to allocate different operations to various ALUs. For example, scheduler 405 may schedule some iterations to ALUs in a Smart SSD (represented as in-storage computing engine 410 in FIG. 4), other iterations to a GPGPU on the host computer, and still other iterations to host CPU 415, among other possibilities.

Figure 5:
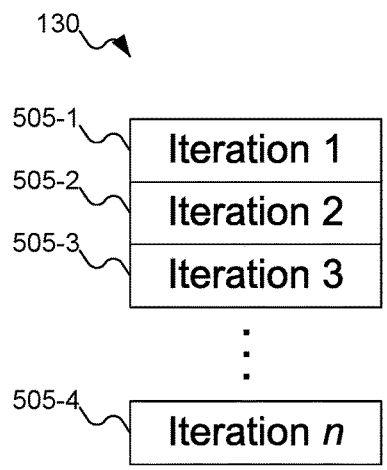
FIG. 5 shows a fast, inexact algorithm with a number of iterations.

As described above, embodiments of the inventive concept are applicable to iterative algorithms that eventually result in a solution. FIG. 5 shows a fast, inexact algorithm with a number of iterations. In FIG. 5, algorithm 130 is shown as including a number of iterations: iteration 1 (505-1), iteration 2 (505-2), iteration 3 (505-3), and so on. In general, one may refer to the n-th iteration of the algorithm, shown as iteration 505-4.

As discussed above, embodiments of the inventive concept may include algorithms with parallel path solving. For example, Coordinate Descent operates by attempting to minimize a function along all possible directions, then selecting the direction that produces the greatest minimization. This approach may be thought of as parallel path solving.

Figure 6:
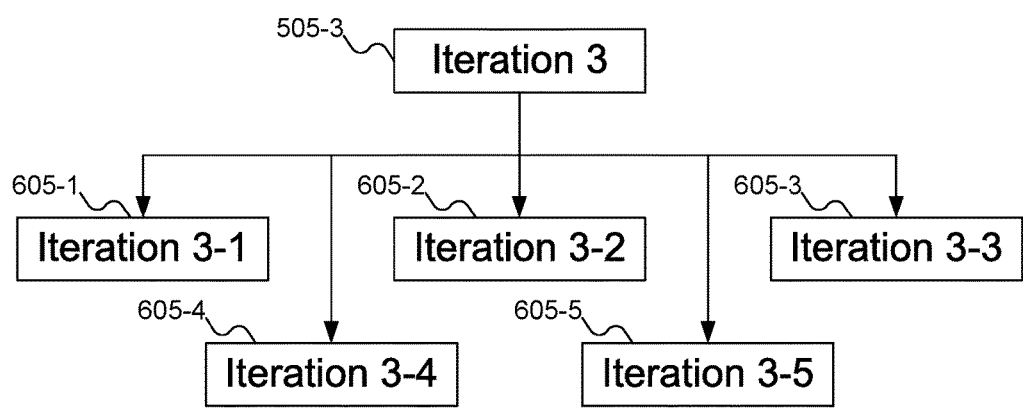
FIG. 6 shows an iteration of the fast, inexact algorithm of FIG. 5 with parallel solutions for an iteration.

FIG. 6 shows an iteration of the fast, inexact algorithm of FIG. 5 with parallel solutions for an iteration. In FIG. 6, iteration 3 (505-3) is shown as including five alternative calculations 605-1, 605-2, 605-3, 605-4, and 605-5, but any iteration could have any number of alternative calculations: the five alternative calculations shown in FIG. 6 are merely exemplary. Depending on the results of the alternative calculations, different improvements in the overall performance of algorithm 130 of FIG. 1 may be calculated from alternative calculations 605-1, 605-2, 605-3, 605-4, and 605-5. Embodiments of the inventive concept may assign different alternative calculations to different processors, and then use the result with the greatest improvement to select a particular path to use. The other paths, calculated using the other alternative calculations, may be discarded.

Figure 7:
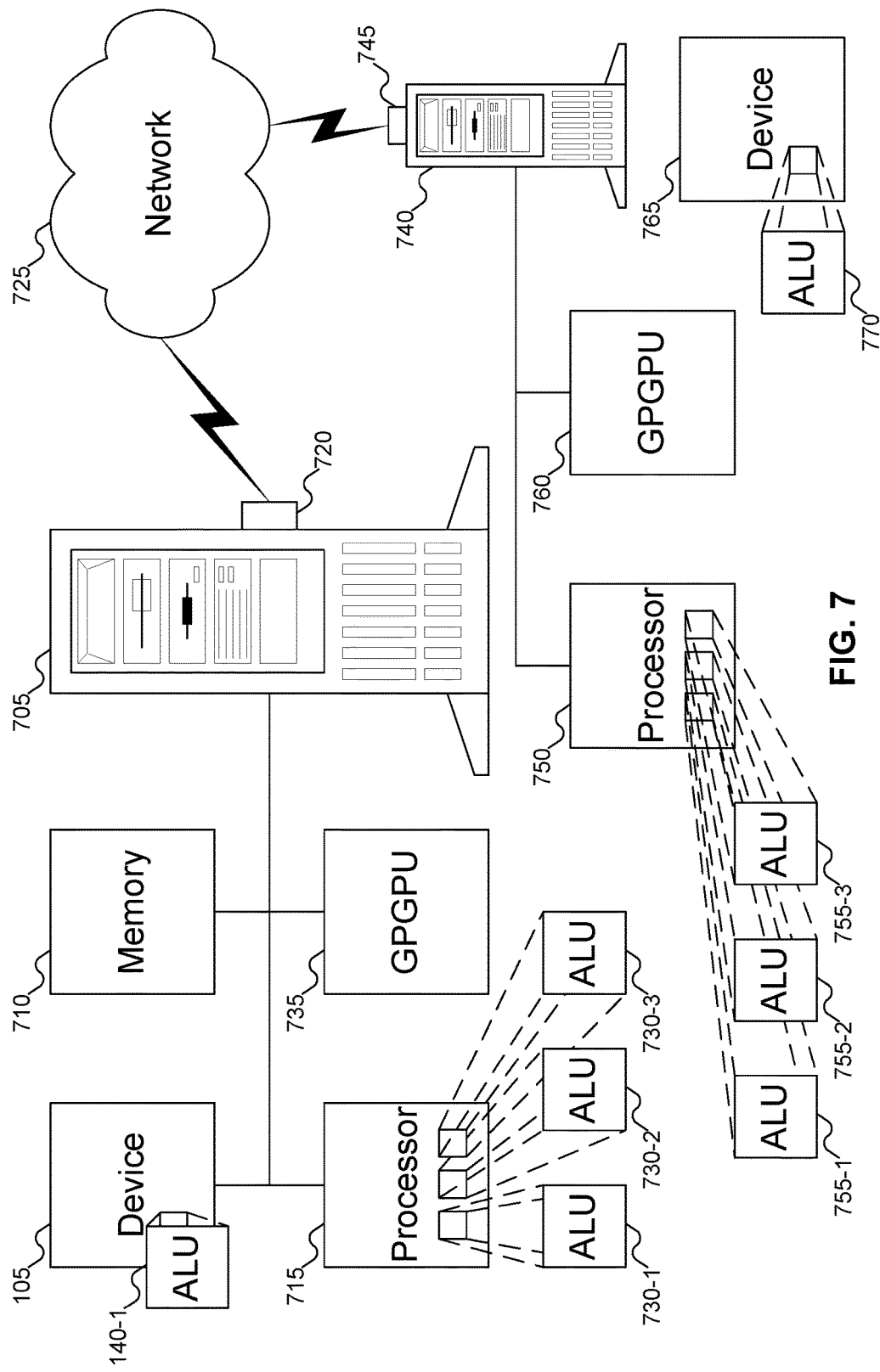
FIG. 7 shows a host computer including the device of FIG. 1, according to an embodiment of the inventive concept.

FIG. 7 shows a host computer including device 105 of FIG. 1, with its own ALUs, such as ALU 140-1, according to an embodiment of the inventive concept. In FIG. 7, host computer 705 is shown. A person skilled in the art will recognize that other components not shown may be attached to host computer 705: for example, other input/output devices, such as a monitor, keyboard, mouse, and/or printer, may be included. In addition, host computer 705 may include conventional internal components such as memory 710, one or more central processing units 715, network adapter 720, and so on. A person skilled in the art will recognize that host computer 705 may interact with other servers and/or computer systems, either directly or over a network, such as network 725, which may be any type of network: for example, Local Area Network (LAN), Wide Area Network (WAN), Virtual Private Network (VPN), or Internet. In addition, although FIG. 7 shows only one network 725, which is intended to represent a LAN or WAN, a person skilled in the art will recognize that host computer 705 may be connected to any number of networks, each network being of the same or different type. To enable communication over network 725, host computer 705 may include a transmitter/receiver (not shown in FIG. 7), which may transmit and receive data. Finally, although FIG. 7 shows host computer 705 as a conventional host computer, a person skilled in the art will recognize that host computer 705 may be any type of machine or computing device, including, for example, a desktop computer, a laptop computer, a tablet computer, a personal digital assistant (PDA), or a smart phone, among other possibilities.

Just like processor 115 of FIG. 1, processor 715 may include various ALUs, such as ALUs 730-1, 730-2, and 730-3. Although FIG. 7 shows processor 715 as including three ALUs, embodiments of the inventive concept may have processor 715 including any number of ALUs. In addition, host computer 705 may include GPGPU 735. Although FIG. 7 shows host computer 705 as including one GPGPU 735, embodiments of the inventive concept may include any number of GPGPUs within host computer 705.

FIG. 7 also shows a second computer 740 that may be connected to host computer 705 via network 725. Second computer 740 may also be called a network computer, for this reason. Like host computer 705, second computer 740 may include network adaptor 745 to interface with network 725, and one or more processors 750, which may include ALUs 755-1, 755-2, and 755-3 and/or GPGPU 760. Second computer 740 may also include its own device 765 that may have ALUs, such as ALU 770. Although FIG. 7 shows device 765 with only one ALU 770, embodiments of the inventive concept may include any number of ALUs in device 765. In addition, device 765 may store the data or the algorithm being used, as described above with reference to FIG. 1. With second computer 740 reachable via network 725, ALUs 755-1, 755-2, 755-3, and 770 may be used to execute iterations of algorithm 130 of FIG. 1 from device 105. While FIG. 7 shows only one network computer 740, embodiments of the inventive concept support any number of network computers and other devices, accessible across network 725, directly connected to host computer 705, or both.

Figure 18:
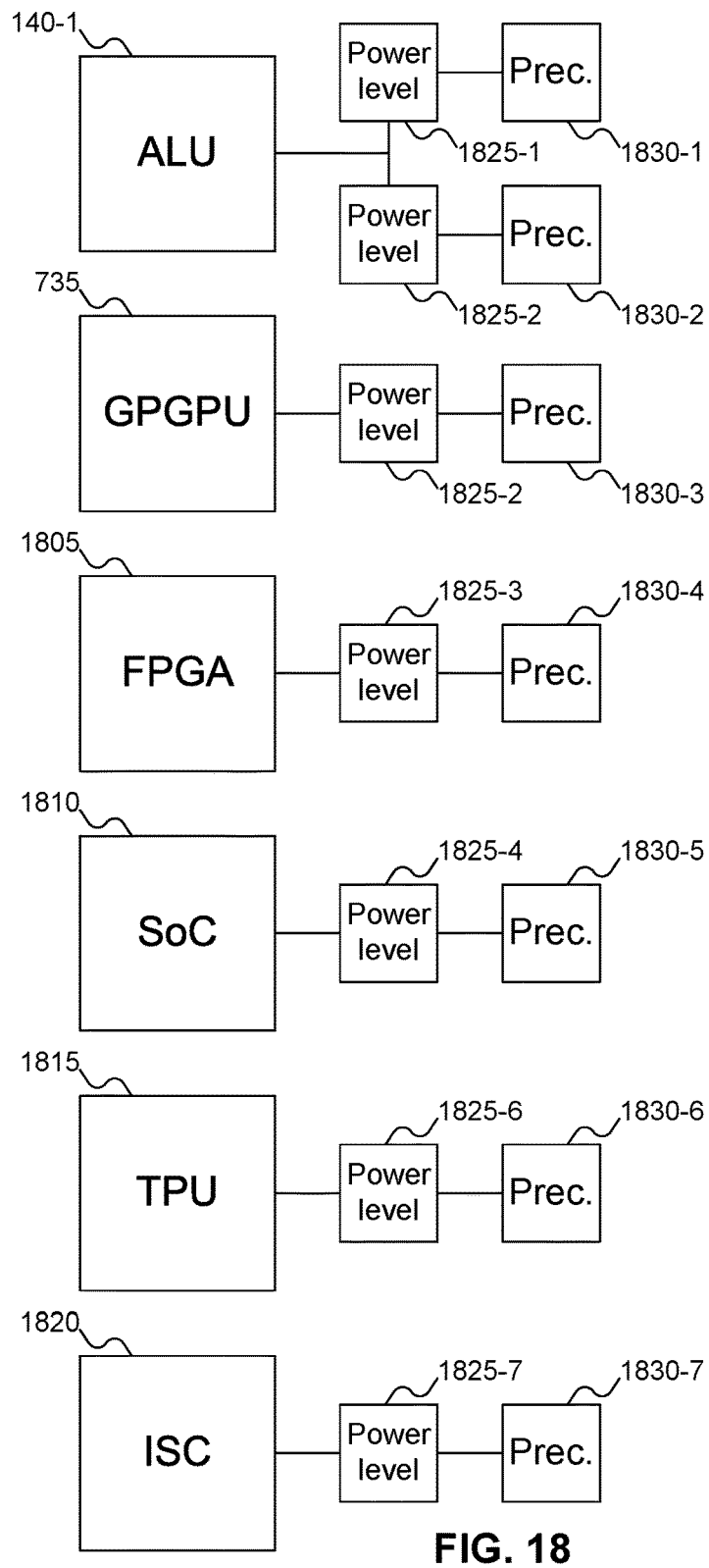
FIG. 18 shows various different ALUs, with different power levels and precisions.

FIG. 18 shows various different ALUs, such as those shown in FIG. 7, with different power levels and precisions. In FIG. 18, an ALU, such as ALU 140-1, a GPGPU, such as GPGPU 735, Field Programmable Gate Array (FPGA) 1805, System-on-a-Chip (SoC) 1810, Tensor Processing Unit (TPU) 1815, and In-Storage Computing (ISC) 1820 are shown, each with corresponding power levels. For purposes of this document, an "ALU" is intended to mean any level of circuitry that may perform mathematical calculations: ALUs, GPGPUs, FPGAs, SoCs, TPUs, and ISCs are merely examples of circuits that may perform mathematical calculations.

For each type of ALU, there may be one or more corresponding power levels. For example, ALU 140-1 is shown with two corresponding power levels 1825-1 and 1825-2, whereas GPGPU 735 is shown with one associate power level 1825-3. Each power level may represent a level of voltage at which the ALU may operate. Some ALUs may support only one power level; other ALUs may support multiple power levels. In general, any ALU may support any number of power levels, and FIG. 18 should not be interpreted as limiting specific types of ALUs to any specific number of power levels. Nor should FIG. 18 be interpreted as requiring all ALUs in an embodiment of the inventive concept to support two power levels. Thus, for example, FPGA 1805 might support three power levels, while ALU 140-1 might only support one power level. In any embodiment of the inventive concept, any ALU types may be used: for each ALU type, there may be any number of ALUs, each with any number of power levels, without limitation.

Corresponding with each power level (and therefore also with each ALU) is a precision. For example, precision 1830-1 represents the precision attainable when using power level 1825-1 on ALU 140-1, precision 1830-2 represents the precision attainable when using power level 1825-2 on ALU 140-1, precision 1830-3 represents the precision attainable when using power level 1825-3 on GPGPU 735, and so on. In general, greater power is required to achieve greater precision. Thus, lower precision calculations may be performed using lower power requirements than higher precision calculations. ALU 140-1 as shown in FIG. 18, with multiple power levels and corresponding precisions, may be an example of a configurable ALU, as described further with reference to FIG. 11 below.

Further, it is possible that an ALU of a given precision may emulate multiple simultaneous lower precision ALUs, each of which may have the same or different precisions. Specifically, a larger ALU might be able to support executing any number of inexact algorithm iteration that may fit into its registers. To take a specific example, a 32-bit ALU might be able to support executing four iterations of inexact algorithms that each operate on 8-bit data. (In this example, the number of bits used (32 and 8) are merely examples: the ALU may operate on data of any desired size, and may operate on as many iterations of inexact algorithms as will fit in the ALU, which may each operate on varying numbers of bits. That is, the larger ALU may have any number of bits, as may each of the "subdivisions" of the larger ALU. So, as a second example, a 64-bit ALU may be subdivided into four 16-bit ALUs, or into eight 8-bit ALUs, or two 16-bit ALUs and one 32-bit ALU, all without loss of generalization.)

Continuing the example of a 32-bit ALU that may execute four iterations of inexact algorithms operating on 8-bit data, the register for the 32-bit ALU may be loaded with data associated with multiple tasks. Provided that the data associated with one task stored in the register does not affect data associated with another task stored in the register (for example, that an arithmetic operation on data in the low-order bits does not overflow into data in higher-order bits), a single ALU may effectively perform multiple tasks.

But where a single register for the ALU is loaded with data associated with multiple tasks (and even potentially where the ALU is physically assembled from multiple smaller processors), the operations that are to be performed on the register likely need to the same operations. For example, it is unlikely that a larger ALU, in either of the above scenarios, may perform addition on data for one task and multiple on data for another task. Thus, in the situation where a single ALU is performing multiple tasks, it is likely that the tasks will need to perform the same operations. This may occur, for example, if there are multiple instances of a single inexact algorithm running: it is likely that the different iterations are performing the same sequences of operations. But if different inexact algorithms also perform the same sequence of operations, then there is no reason that tasks from different inexact algorithms may not be performed at the same time by the same ALU. (In a similar manner, provided that different operations may be performed at the same time on different data within the ALU, it might be possible for a single ALU to perform multiple tasks even where those tasks involve different operation sequences.)

To aid in determining whether multiple tasks may be assigned to the same ALU, each task may include a "fingerprint" (not shown in FIGS. 20-21, described below) of the operation sequence to be performed. This fingerprint might be, for example, a hash of a coding of the sequence of operations. Since the operations to be performed in any iteration of an inexact algorithm are known in advance, this fingerprint may be determined in advance and easily processed by adaptive mechanism 125 of FIG. 19 to determine what tasks might be processed in parallel by a single ALU.

Figure 8:
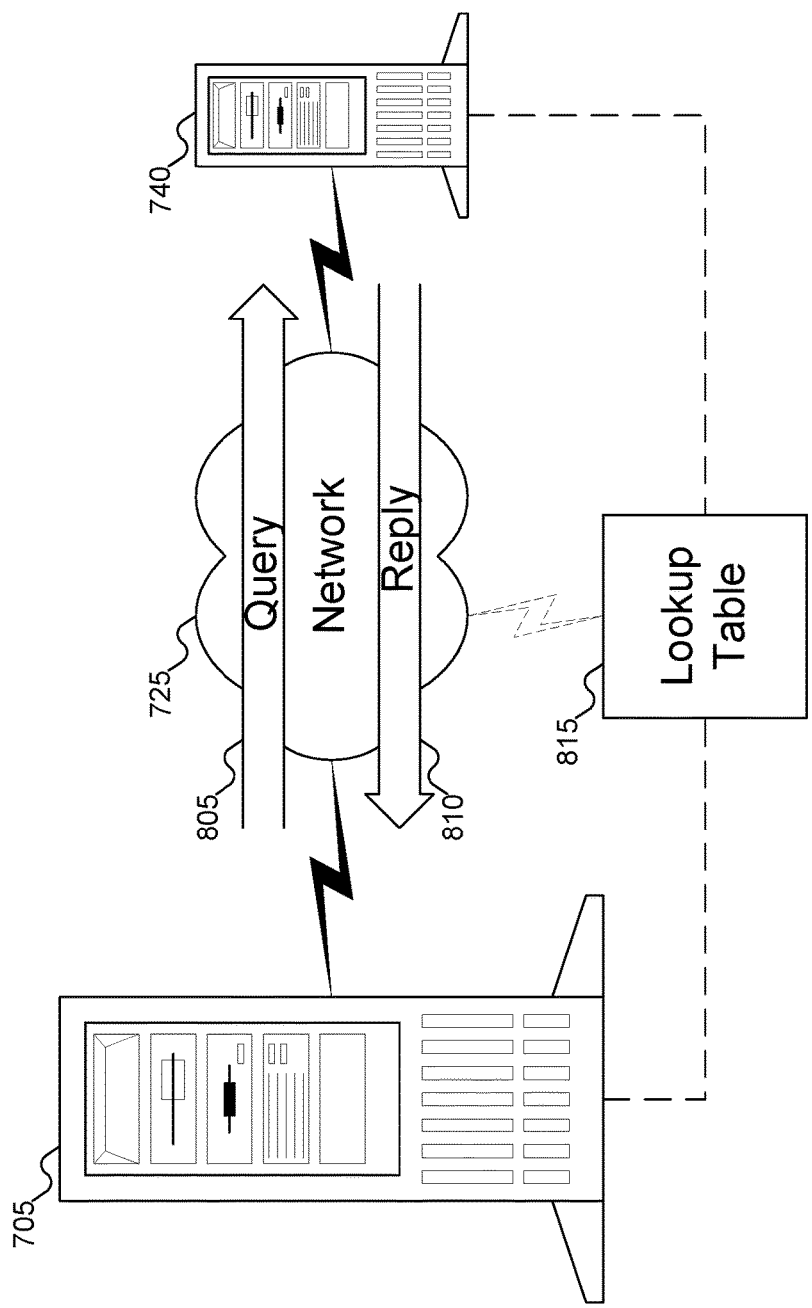
FIG. 8 shows the host computer of FIG. 7 determining available ALUs and their accuracies, according to embodiments of the inventive concept.

For adaptive mechanism 125 of FIG. 1 to be able to assign an iteration of algorithm 130 of FIG. 1 to an ALU, adaptive mechanism 125 of FIG. 1 needs to know what ALUs are available and how accurate they are. FIG. 8 shows different embodiments of the inventive concept that enable adaptive mechanism 125 of FIG. 1 to determine the available ALUs and their accuracies.

In one embodiment of the inventive concept, host computer 740 may query the various devices connected to network 725 to determine what ALUs are available and how accurate they are. For example, FIG. 8 shows host computer sending query 805 to network computer 740. Query 805 may ask network computer 740 what ALUs are installed on or in or available via network computer 740. (For example, network computer 740 may have ALUs available within its processor or GPGPU, but it might also have ALUs accessible via a device with in-storage computing, much like device 105 of FIG. 1.) Network computer 740 may then respond with reply 810, indicating what ALUs are available and how accurate they are.

In some embodiments of the inventive concept, indicating that an ALU is "available" may mean nothing more than the fact that the ALU is installed in network computer 740 or a connected device. But in other embodiments of the inventive concept, indicating that an ALU is "available" may mean more. For example, the processor in network computer 740 might be busy running processes for network computer 740, and those ALUs might not be "available" to run an iteration of algorithm 130 of FIG. 1 for a period of time.

In another embodiment of the inventive concept, host computer 705 and network computer 740 may update lookup table 815 regarding what ALUs are available and how accurate they are. As ALU availability changes, host computer 705 and network computer 740 may update lookup table 815 to reflect the changes. Then, when adaptive mechanism 125 of FIG. 1 requires an ALU to execute an iteration of algorithm 130, adaptive mechanism 125 of FIG. 1 only needs to access lookup table 815 to determine what ALUs are available and how accurate they are. This avoids the need for different algorithms to separately query individual computers to determine available ALUs.

FIG. 9 shows details of an example lookup table 815 of FIG. 8. In FIG. 9, lookup table 815 is shown as including three columns, specifying the location (i.e., machine on the network) housing the ALU, an identifier for the ALU, and the accuracy of the ALU. Thus, computer C1 (903) is shown as including four ALUs: ALU1 (906) with 32-bit accuracy (909), ALU2 (912) with 32-bit accuracy (915), ALU3 (918) with 64-bit accuracy (921), and GPGPU1 (924), with 64-bit accuracy (927). Computer C2 (930) also has four ALUs: ALU4 (933) with 32-bit accuracy (936), ALU5 (939) with 64-bit accuracy (942), ALU6 (945) with 128-bit accuracy (948), and GPGPU2 (951), with 128-bit accuracy (954). Finally, device D1 (957) has ALU7 (960), which is a configurable ALU with a maximum accuracy of 64-bits (963).

While lookup table 815 shows three columns of information, lookup table 815 may include additional columns. For example, lookup table 815 may indicate whether a particular ALU is available at the current time, or other time information.

While FIG. 9 shows lookup table 815 as listing three computers/devices and nine ALUs, embodiments of the inventive concept may include lookup table 815 listing any number of ALUs for any number of computers/devices. Similarly, the accuracies of the ALUs are not limited to 32-bit, 64-bit, and 128-bit accuracies: any accuracy supported by the ALU may be specified.

Although lookup table 815, in the embodiment of the inventive concept shown in FIG. 9, uses distinct identifiers for each ALU, other embodiments of the inventive concept may reuse ALU identifiers, provided that the combination of the ALU identifier and its location is unique. All that is needed is that an ALU may be uniquely identified, and the location of the ALU may be an element used to uniquely identify an ALU.

Figure 10:
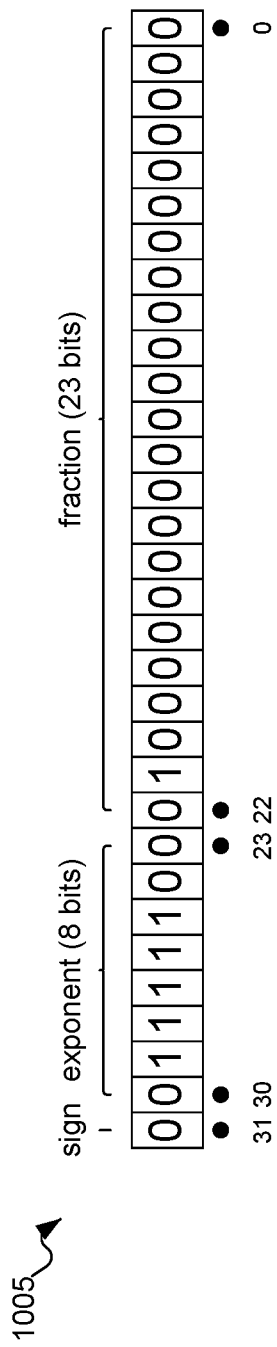
FIG. 10 shows a floating point representation of a number.

As shown in FIG. 9, ALU7 (960) is identified as a configurable ALU; embodiments of the inventive concept may use configurable ALUs. A configurable ALU is an ALU that may be programmed with a desired accuracy. For example, the IEEE Standard for Floating Point Arithmetic (IEEE 754) uses exponent bits and fraction bits to represent numbers. FIG. 10 shows a floating point representation of a number. In FIG. 10, number 1005 is shown using a floating point representation. Number 1005 may use one bit (bit 31) to store the sign of number 1005, eight bits (bits 23-31) to store the exponent part of number 1005, and 23 bits (bits 0-22) to store the fraction part of number 1005.

Inexact computing may be related to the number of bits in the fraction part and/or the exponent part. The more bits used, the greater the accuracy of number 1005. Conversely, the fewer bits used, the lower the accuracy of number 1005. For example, the fraction part of number 1005 may be reduced from 23 bits to 10 bits when the additional accuracy (13 additional bits) is not required. By using only the 10 most significant bits and discarding the 13 least significant bits of the fraction part, reduced accuracy may be achieved.

The exponent part of number 1005 may also be reconfigured in a configurable ALU. But instead of disabling the least significant bits, the most significant bits of the exponent part may be discarded.

The accuracy requirement detection may be done either in software or in hardware. In hardware, simple bit-use detection may be utilized to decide the accuracy requirement. In software, on the other hand, light delta value detection is adequate to detect the bit requirement.

Figure 11:
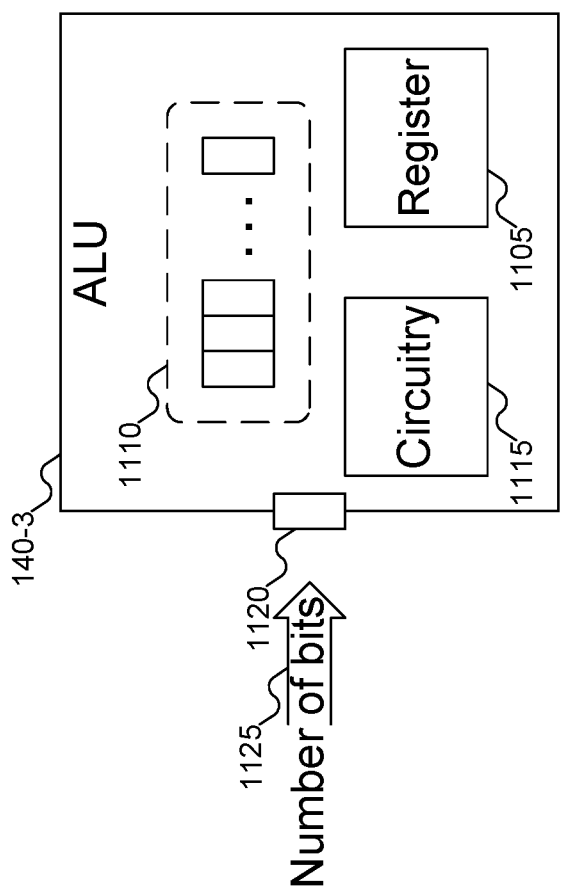
FIG. 11 shows a configurable ALU being configured for a particular accuracy, according to an embodiment of the inventive concept.

FIG. 11 shows a configurable ALU being configured for a particular accuracy, according to an embodiment of the inventive concept. In FIG. 11, ALU 140-3 is shown, which is one of the ALUs within device 105 of FIG. 1, which in turn may be a smart SSD, for example. But ALU 140-3 may be an ALU within host computer 705, network computer 740, or other devices accessible to device 105

ALU 140-3 may include register 1105, which may store data, such as number 1110. ALU 140-3 may also include instructions to perform arithmetic operations on numbers, such as number 1110, with up to a certain number of bits. These instructions may be embodied within circuitry 1115. For example, if ALU 140-3 is the ALU identified as ALU7 (960 of FIG. 9), then ALU 140-3 has a maximum accuracy of 64 bits, meaning that number 1110 is 64 bits in length. But ALU 140-3 may receive an input via port 1120. This input may specify number of bits 1125 to use within number 1110. Thus, for example, number of bits 1125 might be 32 bits, indicating that ALU 140-3 is to perform calculations that are only half as accurate as it may actually support. Reducing the accuracy of ALU 140-3, as noted above, means the resulting calculations are less accurate. But reducing the accuracy of ALU 140-3 may result in faster calculations, trading accuracy for speed. If number 1110 is a floating point number, ALU 140-3 may achieve this reduced accuracy by ignoring the least significant bits of a fractional part of number 1110, or by ignoring the most significant bits of an exponent part of number 1110, or both. If number 1110 is an integer, ALU 140-3 may achieve this reduced accuracy by ignoring the most significant bits of number 1110. Other embodiments of the inventive concept may achieve this reduced accuracy of number 1110 in other ways.

Figure 12:
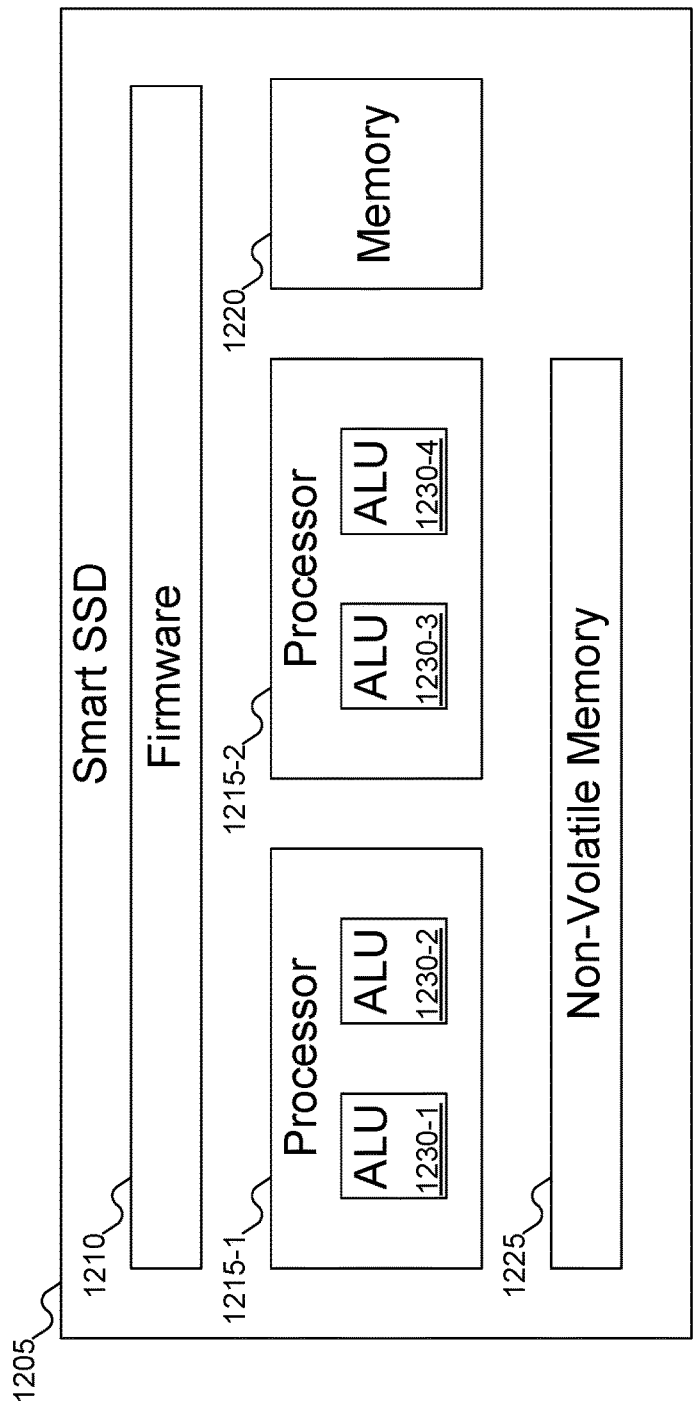
FIG. 12 shows a smart Solid State Drive (SSD) equipped with processors for in-storage computing.

FIG. 12 shows an example smart SSD equipped with processors for in-storage computing. In FIG. 12, smart SSD 1205 is shown. Smart SSD 1205 may include, among other elements, firmware 1210, processors 1215-1 and/or 1215-2, memory 1220, and non-volatile memory 1225. Firmware 1210 may include software that provides control, monitoring and data manipulation of the elements of smart SSD 1205. Processors 1215-1 and 1215-2 may provide in-store computing capabilities to smart SSD 1205. By including processors 1215-1 and 1215-2, with their respective ALUs 1230-1, 1230-2, 1230-3, and 1230-4, data does not need to be migrated from an SSD to local memory in a host computer to be processed: processors 1215-1 and/or 1215-2 may perform computations on data stored in smart SSD 1205. By saving the time and bandwidth needed to move data from smart SSD 1205 into the local memory of the host computer, computation speed is increased. Memory 1220 may be a local "scratchpad" memory used by processors 1215-1 and 1215-2 in performing their computations. And non-volatile memory 1225 may store data long-term for the associated computing device.

If adaptive mechanism 125 of FIG. 1 is aware of ALUs 1230-1, 1230-2, 1230-3, and 1230-4 of smart SSD 1205, and if smart SSD 1205 stores data 135 and algorithm 130 of FIG. 1, then adaptive mechanism 125 of FIG. 1 may schedule iterations of algorithm 130 of FIG. 1 to be performed in one or more of ALUs 1230-1, 1230-2, 1230-3, and 1230-4. As noted above, by performing computations within smart SSD 1205, calculations may be returned more quickly by avoiding the time needed to transfer data between smart SSD 1205 and the local memory of the associated computer.

Figure 19:
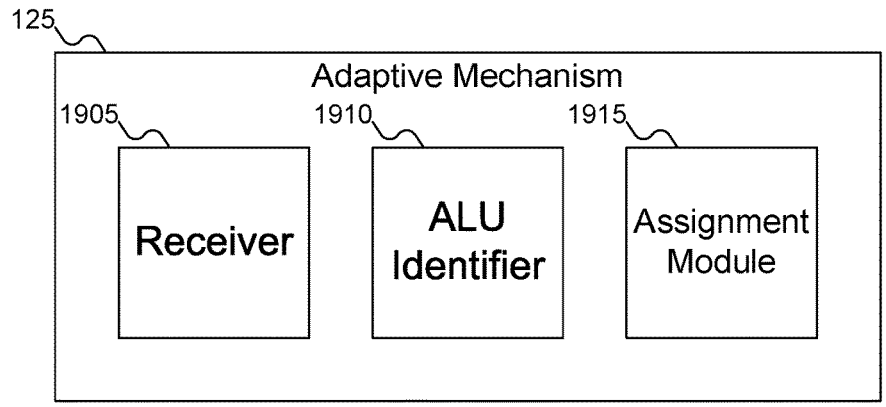
FIG. 19 shows details of the adaptive mechanism of FIG. 1, according to an embodiment of the inventive concept.

FIG. 19 shows details of adaptive mechanism 125 of FIG. 1, according to an embodiment of the inventive concept. In FIG. 19, adaptive mechanism 125 is shown as including receiver 1905, ALU identifier 1910, and assignment module 1915. Receiver 1905 may receive tasks—iterations of inexact algorithms—from whatever processor is requesting execution of the inexact algorithm. Note that receiver 1905 may receive tasks for more than one inexact algorithm. ALU identifier 1910 may identify whatever ALUs are available that may execute the various tasks. And assignment module 1915 may assign tasks to the various available ALUs.

Note that in the situation where there is only one inexact algorithm being executed at one time, there is no problem with assigning any iteration of the inexact algorithm to an available ALU: any sufficiently precise ALU may be selected. But where there are tasks associated with multiple inexact algorithms, particularly with an objective of minimizing the power used by the various ALUs, managing the assignment of tasks to ALUs becomes trickier. For one thing, there might be more tasks to execute than there are ALUs available to execute them. In that situation, some tasks may have to wait to be executed. Put another way, in certain situations, tasks might not be assigned to ALUs for various reasons. When this situation occurs, one must be careful to avoid starving a particular inexact algorithm: that is, preventing the inexact algorithm from completing due to prioritization of other tasks. And even if there are enough ALUs available to execute the tasks, the available ALUs might not include the best choice for a particular task. For example, if none of the available ALUs has sufficient precision to execute the task, or if all the available ALUs offer far greater precision than is required for the tasks, it might be better (or necessary) for the task to wait anyway. (Some inexact algorithm might have a "precision budget", permitting the inexact algorithm to execute tasks with precisions in any order, rather than from lower precision to higher precision. With such an inexact algorithm, it might be possible to execute one iteration with a higher precision first, then with a lower precision later, or vice versa. But the available ALUs still might not offer a precision that would work for the task, even with the option of variable precision choices.)

As noted above, one objective of embodiments of the claimed invention may be to minimize the power consumed by the ALUs in executing the tasks. The problem may be thought of as a multi-dimensional problem: minimizing power consumption while satisfying the precision requirements of the various tasks (and potentially satisfying the maximum execution time for the inexact algorithms, either as a time constraint or a number of iterations that will be needed, as well). But while traditional dynamic programming problems may be solved with all the data known in advance, not all the information about the tasks is known in advance for this heterogeneous scheduling problem. For example, the tasks may arrive at different times, which might not be known in advance. Nor is the prevision of the various tasks necessarily known in advance. And while the power levels and precisions offered by the various ALUs may be known in advance, which ALUs are available at any given time is generally not known in advance. Thus, the heterogeneous scheduling problem is akin to dynamic programming, but with only partial information available at any time.

Figure 20:
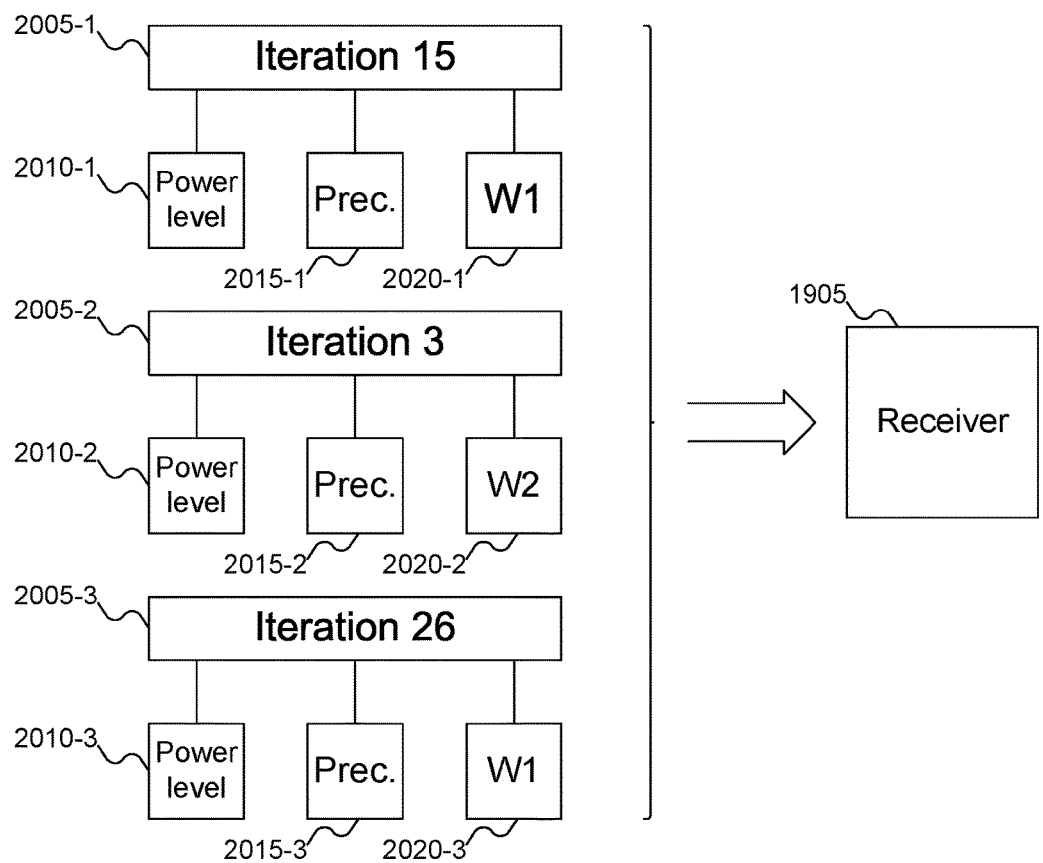
FIG. 20 shows the operation of the receiver of FIG. 19.

FIG. 20 shows the operation of receiver 1905 of FIG. 19. In FIG. 20, receiver 1905 is shown receiving various tasks 2005-1 through 2005-3. While FIG. 20 shows three tasks 2005-1 through 2005-3, receiver 1905 may receive any number of tasks associated with any number of inexact algorithms. Each task may be for a different inexact algorithm or some tasks might be iterations of different instances of the same inexact algorithm. For example, task 2005-1 is shown as iteration 16 of one inexact algorithm, tasks 2005-2 is shown as iteration 3 of a second algorithm, and task 2005-3 is shown as iteration 26 of a third inexact algorithm.

Each task 2005-1 through 2005-3 also has a corresponding power level. Thus, tasks 2005-1 through 2005-3 have corresponding power levels 2010-1 through 2010-3, respectively. Power levels 2010-1 through 2010-3 may represent the power required to execute the corresponding task. But each power level may be equivalent to a precision (or alternatively, each power level may be thought of as the power required to execute the task at a particular precision). Thus, tasks 2005-1 through 2005-3 may have corresponding precisions 2015-1 through 2015-3, respectively.

When an individual task has a power budget, the objective is to execute that task using an ALU that requires no greater power than that corresponding to the task. This concept can be generalized to higher points in the system, such as a particular inexact algorithm or the system of FIG. 7 as a whole. When an inexact algorithm has a power budget, the objective is to complete the execution of the inexact algorithm using at most the specified power budget; when the system as a whole has a power budget, the objective is to keep total power used by the system below the power budget.

Finally, as mentioned above, one objective of embodiments of the claimed invention is to avoid starving an inexact algorithm (or a task) that is being deferred at the current time. To that end, each task 2005-1 through 2005-3 may also include a corresponding weight 2020-1 through 2020-3, respectively. Weights 2020-1 through 2020-3 may indicate whether a particular task has been deferred before, and therefore should be given greater priority. (While FIG. 20 shows weights 2020-1 through 2020-3 being part of the information received by receiver 1905, weights 2020-1 through 2020-3 may also be generated within adaptive mechanism 125 of FIG. 19 and stored therein until a task is assigned to an ALU and executed.) Thus, for example, tasks 2005-1 and 2005-3 each have weight level 1, whereas task 2005-2 has weight level 2, indicating that it should have a higher priority.

Of course, knowing the tasks to be executed is only half of the information needed to assign tasks to ALUs: the set of available ALUs also needs to be known. ALU identifier 1910 of FIG. 19 may identify the available ALUs. ALU identifier 1910 of FIG. 19 may operate in any number of different ways. For example, ALU identifier 1910 of FIG. 19 may interrogate each accessible machine or device connected to adaptive mechanism 125 of FIG. 19 for what ALUs are present, the power level(s) supported by the ALUs, and the precisions offered at that power level(s). Alternatively, each ALU accessible to adaptive mechanism 125 of FIG. 19 may report its power level(s) and precision(s) to adaptive mechanism 125 of FIG. 19. ALU identifier 1910 of FIG. 19 may also track which ALUs are actively executing tasks (or other applications), to know which ALUs are available for task assignment (since it would not be helpful to assign a task to an ALU that is already busy). ALU identifier 1910 of FIG. 19 generally needs to operate only once, since the ALUs that are accessible from adaptive mechanism 125 of FIG. 19 generally do not change; but if embodiments of the inventive concept support the introduction or removal of ALUs (for example, as machines are added or removed from the network), ALU identifier 1910 of FIG. 19 may operate repeatedly and/or regularly to keep track of the current set of available ALUs.

Figure 21:
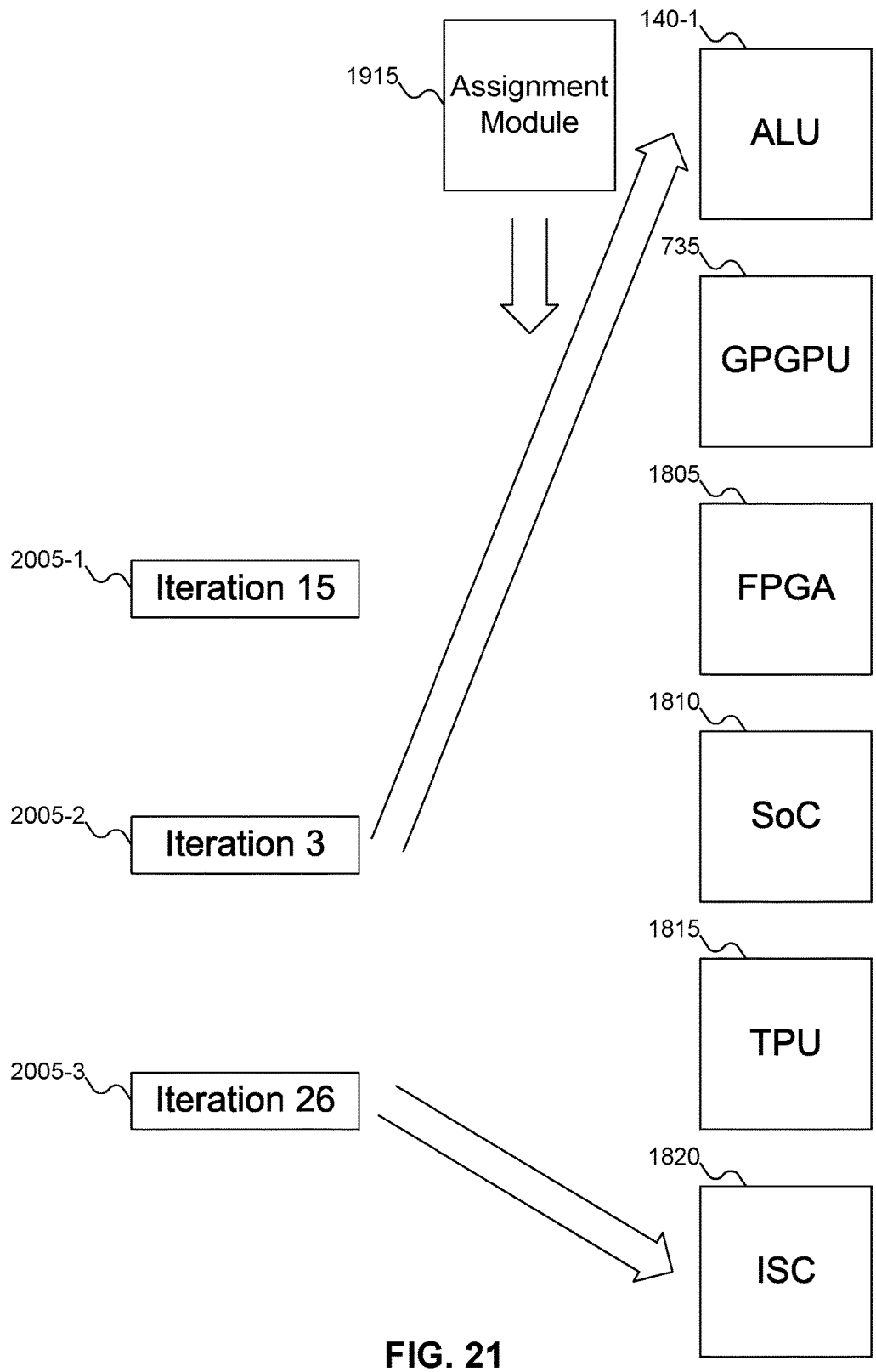
FIG. 21 shows the operation of the assignment module of FIG. 19.

Given the information about the various tasks received by receiver 1905 and the available ALUs determined by ALU identifier 1910 of FIG. 19, assignment module 1915 of FIG. 19 may then assign tasks to the available ALUs. FIG. 21 shows the operation of assignment module 1915 of FIG. 19. In FIG. 21, assignment module 1915 is shown assigning task 2005-2 to ALU 140-1 and task 2005-3 to ISC 1820. (As shown in the example of FIG. 18, ALU 140-1 may have two power levels and two precisions: task 2005-2 may be assigned to ALU 140-1 to use either power level/precision.) Task 2005-1 is not shown as assigned to any ALU. For example, there might be no available ALU (all the other ALUs shown might be currently busy), or none of the available ALUs offers a power level/precision approximately equivalent to power level 2010-1/precision 2015-1 of FIG. 20. Note also that task 2005-2 was favored over task 2005-1 based on weights 2020-1 and 2020-2 of FIG. 20.

Assignment module 1915 may operate in any desired manner. For example, assignment module 1915 may order the available tasks based on their power level, from lowest to highest. With the set of available ALUs also ordered by power level from lowest to highest, assignment module 1915 may then select the task with the lowest power level and locate the ALU with the lowest power level and a precision sufficient to satisfy the task. This process may then be repeated until all tasks received by receiver 1905 of FIG. 19 have been processed (or deferred, if no appropriate ALU may be selected). Where power budgets are also factored in, assignment module 1915 may also consider how much power has been consumed by the inexact algorithm to date, or by the system as a whole, in determining algorithm assignments.

Figure 22:
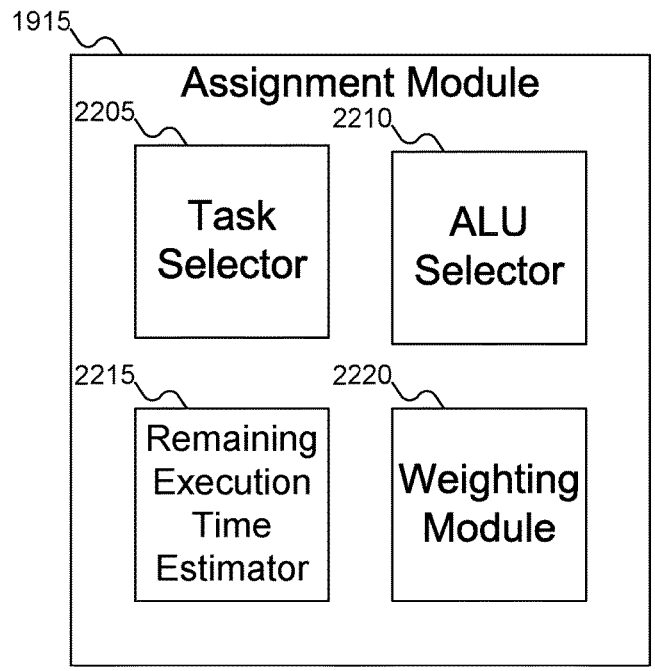
FIG. 22 shows details of the assignment module of FIG. 19.

FIG. 22 shows details of assignment module 1915 of FIG. 19. In FIG. 22, assignment module 1915 may include task selector 2205 and ALU selector 2210. Task selector 2205 may select a particular task from those received by receiver 1905 of FIG. 19. ALU selector 2210 may then select an ALU from the set of available ALUs to which the task may be assigned (or not select any ALU to assign to the task, if no appropriate ALU may be identified from the set of available ALUs). As described above, task selector 2205 may operate by ordering the tasks awaiting assignment by their corresponding power levels, and ALU selector 2210 may select an ALU that may provide the required precision for the task at the lowest power level. More generally, task selector 2205 may select the highest priority task waiting to be assigned to an ALU: priority may be determined from the power level corresponding to the task, the weight assigned to the task, any other criterion, or any combination of criteria using any desired formula. For example, using both weights and power level, task selector 2205 may first identify all the tasks with the highest weight, then select the task with the lowest power level at that weight.

As discussed above with reference to FIG. 1, an inexact algorithm might have associated maximum execution time 145 of FIG. 1, which may represent the maximum time the inexact algorithm is expected to take to complete. Since optimizing power consumption may be more important than satisfying a time constraint on an inexact algorithm, some embodiments of the inventive concept may support optimizing power consumption by the ALUs, even where the inexact algorithm does not complete execution within maximum execution time 145 of FIG. 1.

But even if the objective is to optimize power consumption, it might still be possible to optimize power and still satisfy maximum execution time 145 of FIG. 1. To that end, remaining execution time estimator 2215 may estimate the remaining time needed to complete execution of the inexact algorithm. (The operation of remaining execution time estimator 2215 is discussed further below with reference to FIGS. 23-24B.) Once the remaining execution time of the inexact algorithm is known, that value, combined with the time required to date to execute the inexact algorithm (which may easily be tracked by subtracting the current time from the time the inexact algorithm began executing) may be used to determine if it is still possible to complete the inexact algorithm within maximum execution time 145 of FIG. 1.

Finally, as discussed above, a task might not be assigned to any ALU, if no appropriate ALU may found. To avoid that task starving, weighting module 2220 may be used to assign weights, such as weights 2020-1 through 2020-3 of FIG. 20, to tasks. Weights 2020-1 through 2020-3 may then be used to prioritize tasks that have been deferred. Weighting module 2220 may operate in any desired manner. For example, weights 2020-1 through 2020-3 may count the number of times a task has been selected by task selector 2205 and deferred (so that the more times a particular task is deferred, the greater its weight is considered to be). Or, weighting module may track how long a task has been deferred, compare that to some baseline delay, and assign a weight accordingly. For example, if 10 milliseconds (ms) is considered a baseline delay, then if a task has waited less than 10 ms, the task may be assigned a weight of 1, if the task has waited more than 10 ms but less than 20 ms, the task may be assigned a weight of 2, if the task has waited more than 20 ms but less than 30 ms, the task may be assigned a weight of 3, and so on. As described above, these weights may then be used to prioritize tasks that have been deferred for some reason, to prevent tasks from starving.

Figure 23:
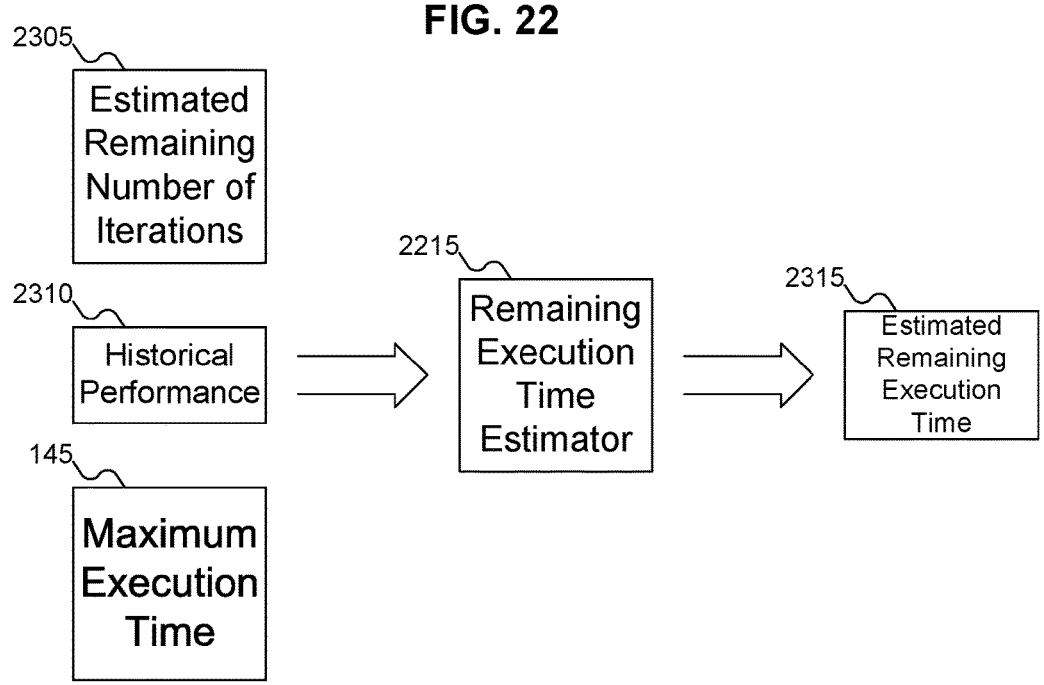
FIG. 23 shows the operation of the remaining execution time estimator of FIG. 22.

FIG. 23 shows the operation of remaining execution time estimator 2215 of FIG. 22. In FIG. 23, remaining execution time estimator 2215 may receive various information. This various information may include, for example, estimated remaining number of iterations 2305 for the inexact algorithm in question, historical performance 2310 of the inexact algorithm in question, and maximum execution time 145. The information received by remaining execution time estimator 2215 may also be a different set of information, or a subset of the information shown in FIG. 23. From this information, remaining execution time estimator 2215 may calculate remaining execution time 2315, using any desired formula.

Figure 24A:
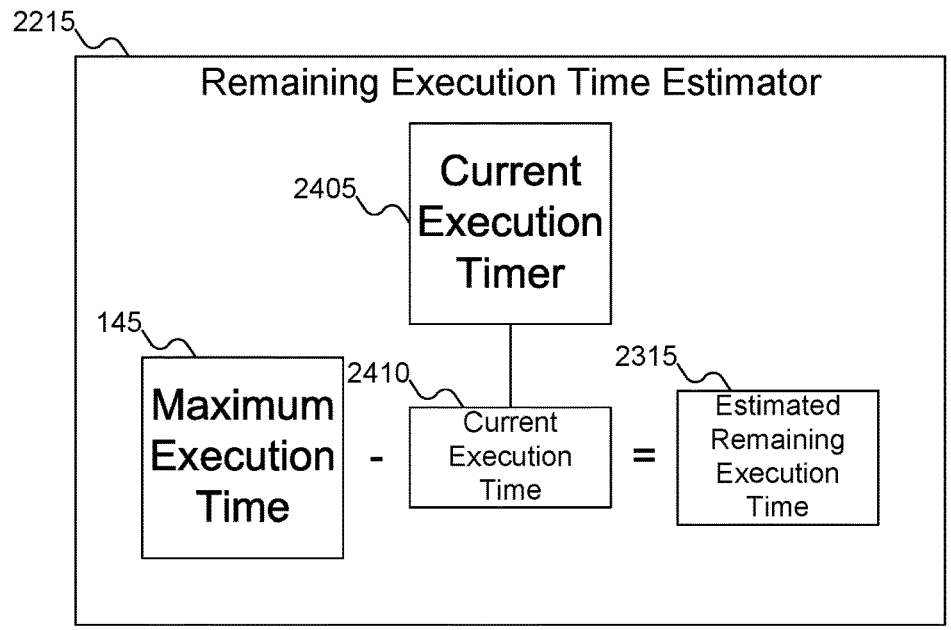
FIGS. 24A-24B show details of the remaining execution time estimator of FIG. 22, according to alternative embodiments of the inventive concept.
Figure 24B:
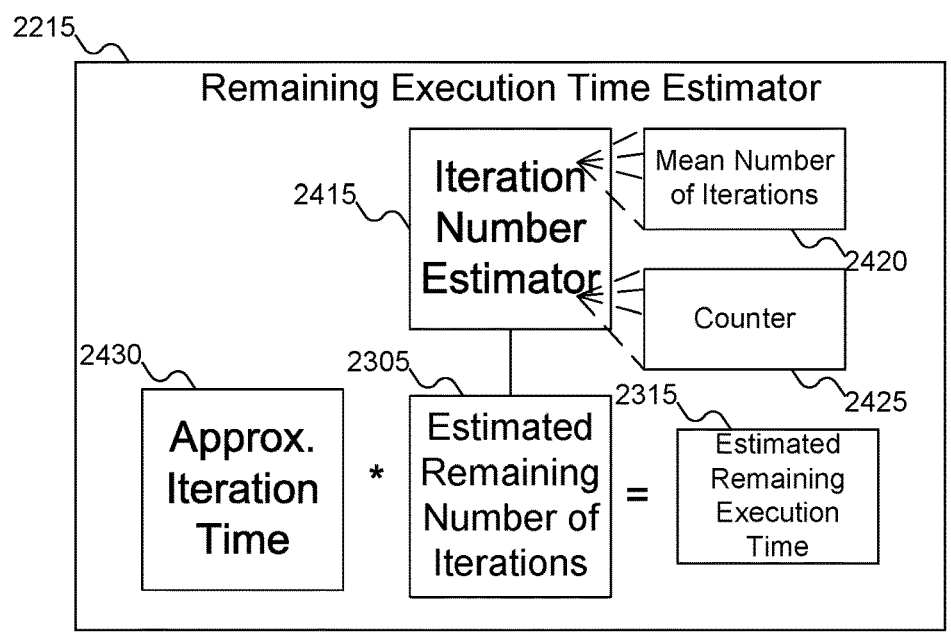

For obvious reasons, the specific formula used to calculate remaining execution time 2315 depends on the data being used. FIGS. 24A-24B show details the remaining execution time estimator 2215 of FIG. 22, according to alternative embodiments of the inventive concept. In FIG. 24A, remaining execution time estimator 2215 may calculate estimated remaining execution time 2315 based on how long the inexact algorithm has already executed, relative to maximum execution time 145 of the inexact algorithm. (For obvious reasons, remaining execution time estimator 2215 as shown in FIG. 24A would not be used to calculate estimated remaining execution time 2315 for an inexact algorithm that does not have a maximum execution time.)

Remaining execution time estimator 2215 may include current execution timer 2405, which may measure current execution time 2410, either by tracking how much time the inexact algorithm has actually spent executing (for example, by measuring the time a task is assigned to an ALU until receiver 1905 of FIG. 19 receives the next task for the inexact algorithm), or by subtracting a current time from a time when the inexact algorithm began executing. Remaining execution time estimator 2215 may then calculate estimated remaining execution time 2315 by subtracting current execution time 2410 from maximum execution time 145.

On the other hand, in FIG. 24B, remaining execution time estimator 2215 may include iteration number estimator 2415. Iteration number estimator 2415 may determine estimated remaining number of iterations 2305, which may be an estimate of the number of iterations needed to completely execute the inexact algorithm. Estimated remaining number of iterations 2305 may be estimated from mean number of iterations 2420 (for the inexact algorithm), which may be determined form historical performance 2310 of FIG. 23, and from counter 2425, which may be a count of the number of iterations currently executed by the inexact algorithm. Then, remaining execution time estimator 2215 may calculate estimated remaining execution time 2315 as the product of estimated remaining number of iterations 2305 and approximate iteration time 2430 (which may also be determined from historical performance 2310 of FIG. 23: for example, as the mean or median execution time for iterations the inexact algorithm).

While FIGS. 24A-24B present alternative embodiments of the inventive concept, embodiments of the inventive concept may include more than one implementation of remaining execution time estimator 2215: the various embodiments are not mutually exclusive. In addition, the alternative embodiments shown in FIGS. 24A-24B show possible implementations for remaining execution time estimator 2215, but other implementations are also possible: all such variations on remaining execution time estimator 2215 are intended to be covered.

Historical performance 2310 of FIGS. 23-24B has other uses than just to determine estimated remaining number of iterations 2305 of FIG. 24B or approximate iteration time 2430 of FIG. 24B. For example, historical performance 2310 of FIG. 23 may also be used to estimate a level of precision for a particular task, either now or in the future. This may be useful if, say, a task does not provide the expected precision when the task is received at receiver 1905 of FIG. 19.

While not explicitly shown in FIGS. 19-24B, adaptive mechanism 125 of FIG. 19 may store certain information, such as historical performance 2310 of FIG. 23, counter 2425 of FIG. 24B, and other information. This information may be stored in any desired storage, which may be part of adaptive mechanism 125 of FIG. 19 or any component or sub-component, or it may be stored elsewhere (for example, memory 710 of FIG. 7 or some storage device).

Figure 13A:
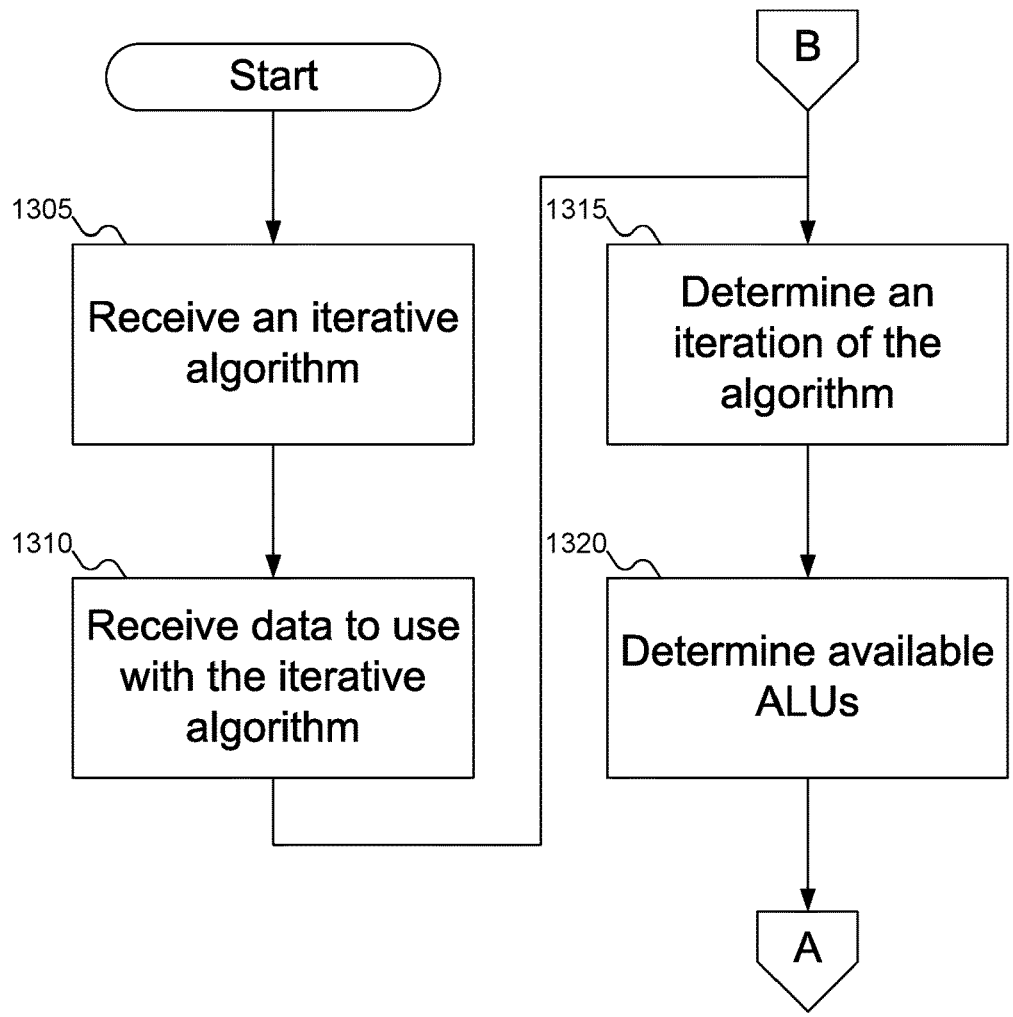
FIGS. 13A-13B show a flowchart of an example procedure for using the device of FIG. 1 to improve a fast, inexact algorithm using variable accuracy, according to an embodiment of the inventive concept.
Figure 13B:
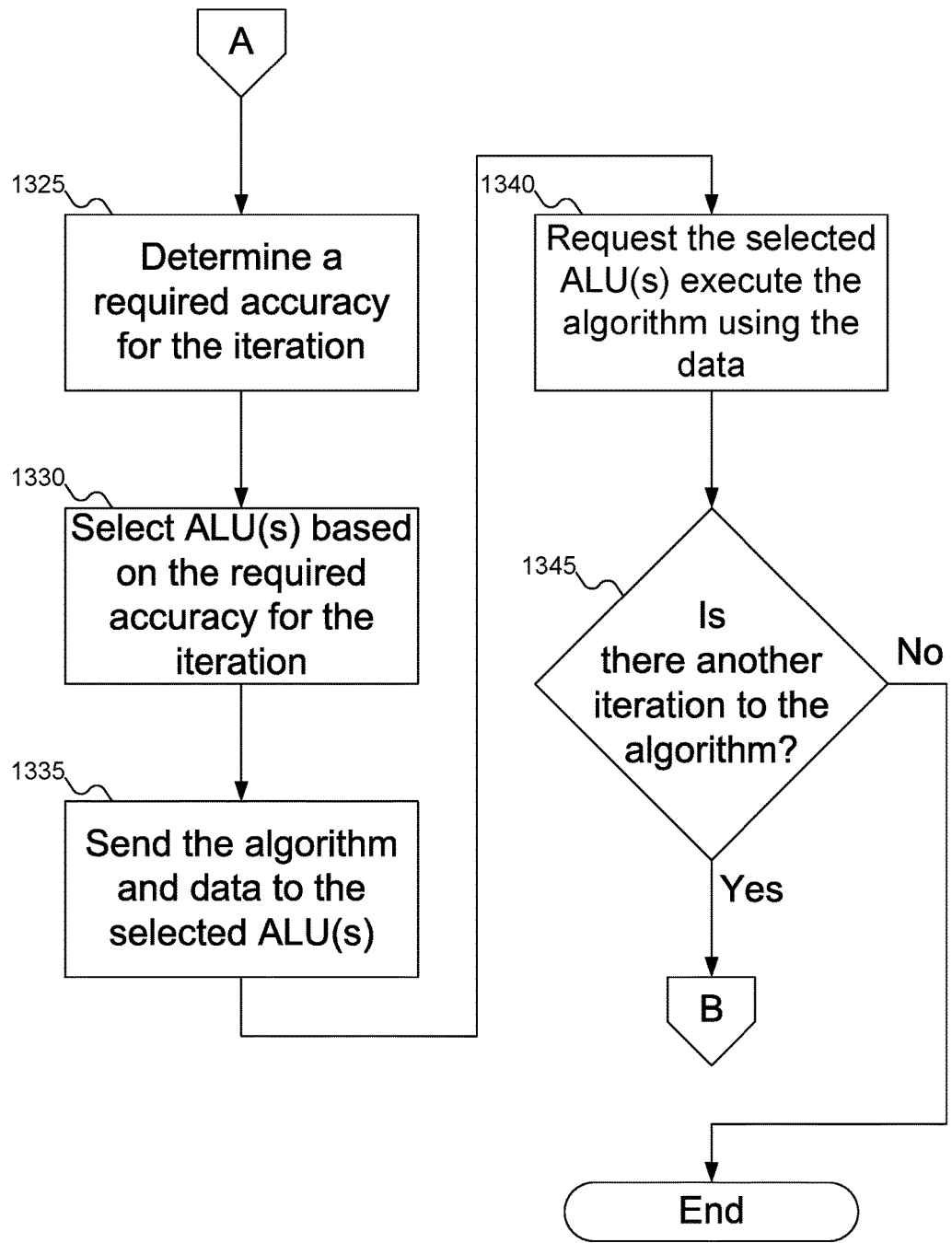

FIGS. 13A-13B show a flowchart of an example procedure for using the device of FIG. 1 to improve a fast, inexact algorithm using variable accuracy, according to an embodiment of the inventive concept. In FIG. 13A, at block 1305, device 105 of FIG. 1 may receive algorithm 130 of FIG. 1. At block 1310, device 105 of FIG. 1 may receive data 135. At block 1315, adaptive mechanism 125 of FIG. 1 may identify an iteration of algorithm 130 of FIG. 1 that is to be executed. At block 1320, adaptive mechanism 125 of FIG. 1 may determine what ALUs are available that might be able to execute the iteration of algorithm 130 of FIG. 1.

At block 1325 (FIG. 13B), accuracy requirement detector 120 of FIG. 1 may determine the required accuracy for the iteration of algorithm 130 of FIG. 1. At block 1330, adaptive mechanism 125 of FIG. 1 may select one or more ALUs to execute the iteration of algorithm 130 of FIG. 1, based on the required accuracy. At block 1335, adaptive mechanism 125 of FIG. 1 may send algorithm 130 and data 135 of FIG. 1 to the selected ALU(s). At block 1340, adaptive mechanism 125 of FIG. 1 may request the selected ALU(s) to execute algorithm 130 of FIG. 1 using data 135 of FIG. 1. At block 1345, adaptive mechanism 125 of FIG. 1 may determine whether there is another iteration of algorithm 130 of FIG. 1 to execute. If so, then processing returns to block 1315 of FIG. 13A. Otherwise, processing ends.

A few comments about the flowchart shown in FIGS. 13A-13B are in order. First, although FIGS. 13A-13B describe device 105 of FIG. 1 as receiving algorithm 130 and data 135 of FIG. 1, any appropriate element of the system may receive algorithm 130 and data 135 of FIG. 1. For example, host computer 705 of FIG. 7 may receive these elements. Second, although FIGS. 13A-13B describe accuracy requirement detector 120 of FIG. 1 as determining the required accuracy for the iteration of algorithm 130 of FIG. 1, the accuracy requirement may come from algorithm 130 of FIG. 1 instead. Third, although FIG. 13A-13B describe algorithm 130 and data 135 of FIG. 1 being sent to the selected ALU(s), it might happen that algorithm 130 and/or data 135 of FIG. 1 do not need to be sent to the selected ALUs. For example, if the selected ALU is an ALU within device 105 which stores data 135 of FIG. 1, then the ALU already has access to data 135. Or, if the selected ALU was used to execute an earlier iteration of algorithm 130 and still stores algorithm 130 and/or data 135 of FIG. 1, then the selected ALU does not algorithm 130 and/or data 135 of FIG. 1 to be sent to it. Fourth, the reason FIGS. 13A-13B describe potentially selecting and using multiple ALUs is to support parallel path search, as described above with reference to FIG. 6.

In FIGS. 13A-13B (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Figure 14A:
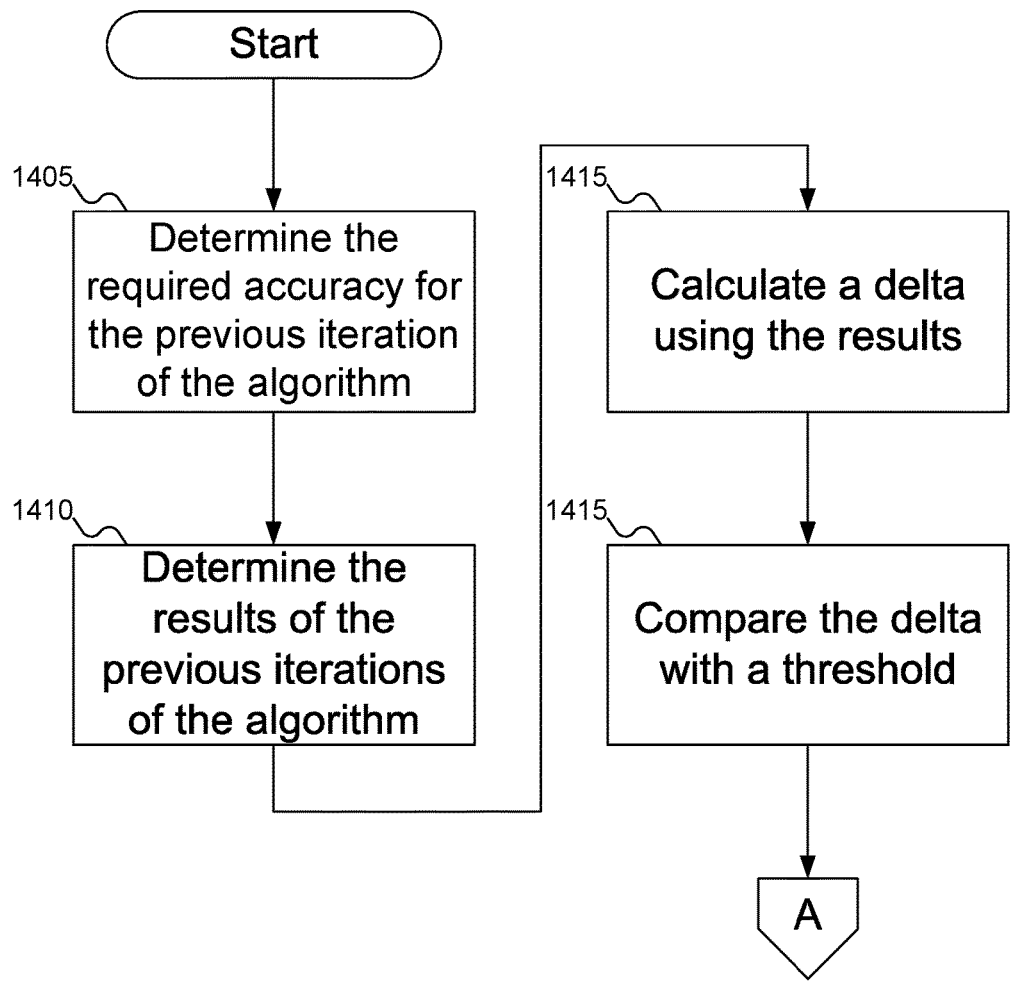
FIGS. 14A-14B show a flowchart of an example procedure for determining an accuracy for an iteration of the fast, inexact algorithm, according to an embodiment of the inventive concept.
Figure 14B:
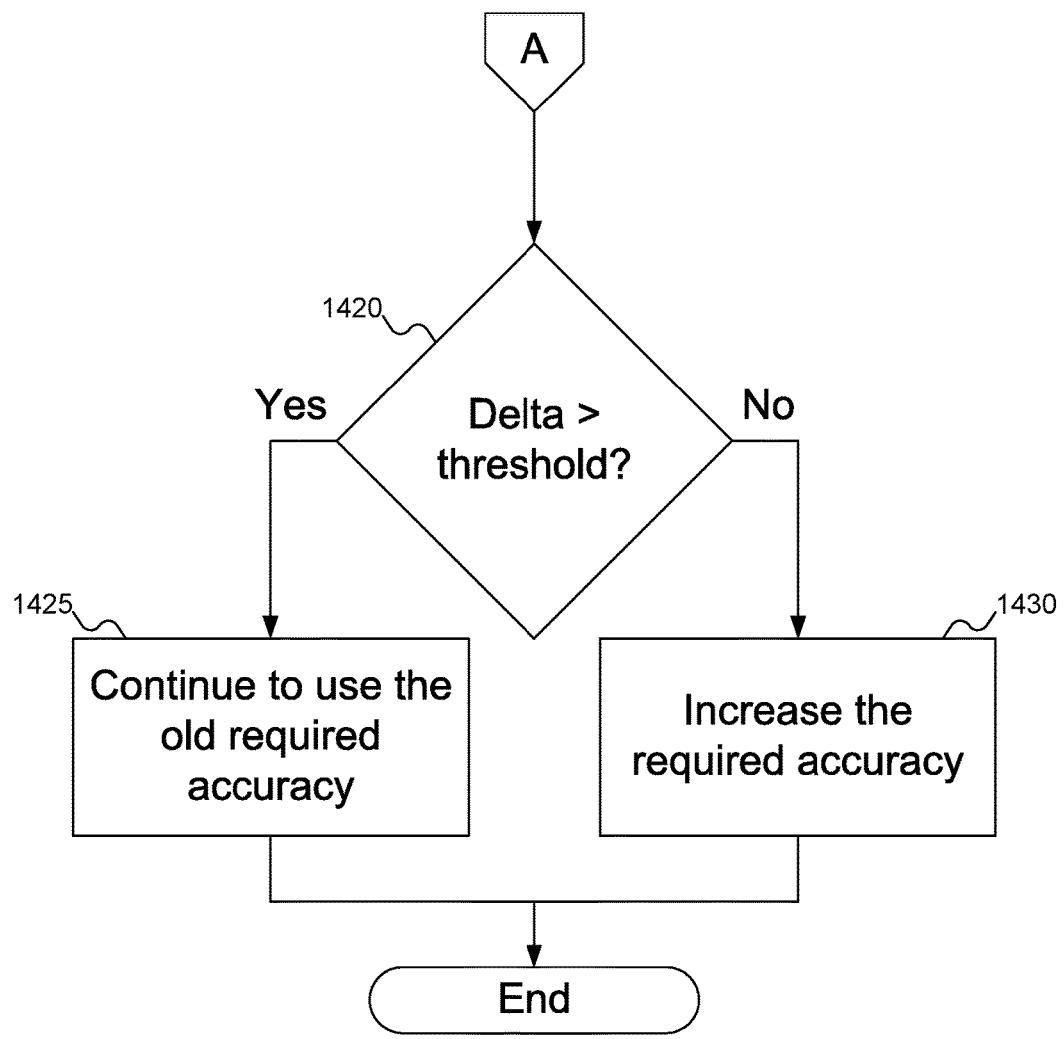

FIGS. 14A-14B show a flowchart of an example procedure for determining an accuracy for an iteration of the fast, inexact algorithm, according to an embodiment of the inventive concept. In FIG. 14A, at block 1405, accuracy requirement determiner 120 of FIG. 1 may determine the accuracy for the previous iteration of algorithm 130 of FIG. 1. At block 1410, accuracy requirement determiner 120 of FIG. 1 may determine the results of previous iterations of algorithm 130 of FIG. 1. Accuracy requirement determiner 120 of FIG. 1 may determine any number of results of previous iterations. For example, accuracy requirement determiner 120 of FIG. 1 may determine the results of two previous iterations, or any number of previous iterations. Regardless of the number of results determined, at block 1415 accuracy requirement determiner 120 of FIG. 1 may determine delta 210 of FIG. 2 using the results. If two results are used, delta 210 of FIG. 2 may be simply the difference between the two results. If more than two results are used, a more complicated calculation may be used. For example, differences between pairs of results in consecutive iterations may be computed, and those differences may then be averaged. Or the differences may be weighted to favor results from more recent iterations, or from older iterations. Any desired formula to calculate delta 210 of FIG. 2 may be used. Regardless of the formula used to calculate delta 210 of FIG. 2, at block 1415, accuracy requirement determiner 120 of FIG. 1 may compare delta 210 of FIG. 2 with threshold 215 of FIG. 2.

At block 1420 (FIG. 14B), the result of the comparison between delta 210 of FIG. 2 and threshold 215 of FIG. 2 may be determined. If delta 210 of FIG. 2 is greater than threshold 215 of FIG. 2, then at block 1425 accuracy requirement determiner 120 of FIG. 1 may continue to use the existing accuracy requirement. But if delta 210 of FIG. 2 is less than threshold 215 of FIG. 2, then at block 1430, accuracy requirement determiner 120 of FIG. 1 may set an increased accuracy requirement. With this increased accuracy requirement may come a new threshold for when the accuracy requirement might need to be increased again.

Figure 15:
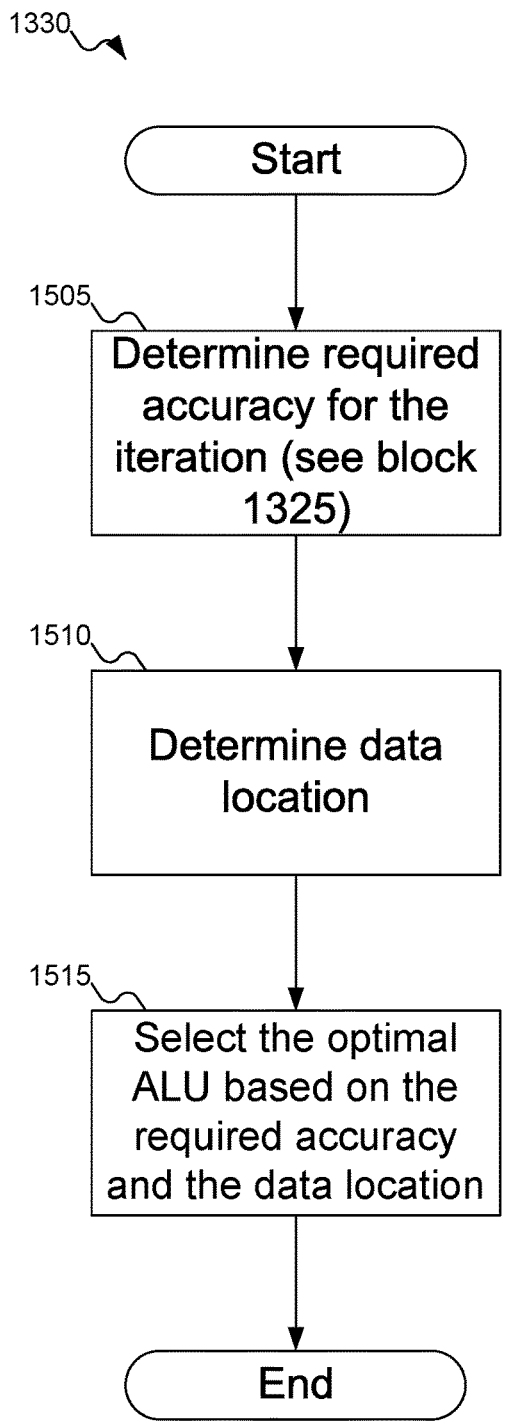
FIG. 15 shows a flowchart of an example procedure for selecting an ALU appropriate for the required accuracy of an iteration of the fast, inexact algorithm, according to an embodiment of the inventive concept.

FIG. 15 shows a flowchart of an example procedure for selecting an ALU appropriate for the required accuracy of an iteration of the fast, inexact algorithm, according to an embodiment of the inventive concept. In FIG. 15, at block 1505, adaptive mechanism 125 of FIG. 1 may determine required accuracy 205 of FIG. 2 for the iteration of algorithm 130 of FIG. 1. This block may be simply a copy of block 1325 of FIG. 13B, and not involve a separate implementation of execution from block 1325 of FIG. 13B. At block 1510, adaptive mechanism 125 of FIG. 1 may determine where the data is stored. As described above with reference to FIGS. 1 and 7, algorithm 130 and data 135 may be stored on separate devices, which may affect the choice of ALU to execute an iteration of algorithm 130 of FIG. 1. At block 1515, adaptive mechanism 125 of FIG. 1 may select an ALU to execute the iteration of algorithm 130 of FIG. 1. The selection of ALU may factor in, among other considerations, which ALU(s) have sufficient accuracy without using an ALU with excessive accuracy. For example, if required accuracy 205 of FIG. 2 would be satisfied by an ALU with 32-bit accuracy, adaptive mechanism 125 of FIG. 1 may select an ALU with 32-bit accuracy rather than, say, an ALU with 64-bit accuracy. Of course, if no 32-bit ALUs are available, then adaptive mechanism 125 of FIG. 1 might select an ALU with 64-bit accuracy anyway, as the latency associated with a higher-accuracy ALU might be less than the delay to wait for a 32-bit ALU to become available.

Another factor adaptive mechanism 125 of FIG. 1 may consider in selecting an ALU may be the location of the data. For example, if there are multiple ALUs with required accuracy 205 available, adaptive mechanism 125 of FIG. 1 may select an ALU that is closest to the location of data 135 of FIG. 1. Selecting an ALU close to the location of data 135 of FIG. 1 may reduce the time needed to transfer the data from device 105 of FIG. 1 to memory near the selected ALU.

While the above description suggests that adaptive mechanism 135 of FIG. 1 favors an ALU with minimally sufficient accuracy over other considerations, other embodiments of the inventive concept may favor other considerations. For example, adaptive mechanism 135 of FIG. 1 may favor an SPU on the device storing data 130 of FIG. 1 over other ALUs, even if the SPU has a greater accuracy than is required. Or adaptive mechanism 135 of FIG. 1 may consider the bandwidth between data 135 of FIG. 1 and the available ALUs, and select an ALU to which data 135 of FIG. 1 may be transferred most quickly, again even if the selected ALU has a higher accuracy than is required. Embodiments of the inventive concept may consider all such variations in how to select an ALU, including how to "break ties" between ALUs that are otherwise equally viable.

Figure 16A:
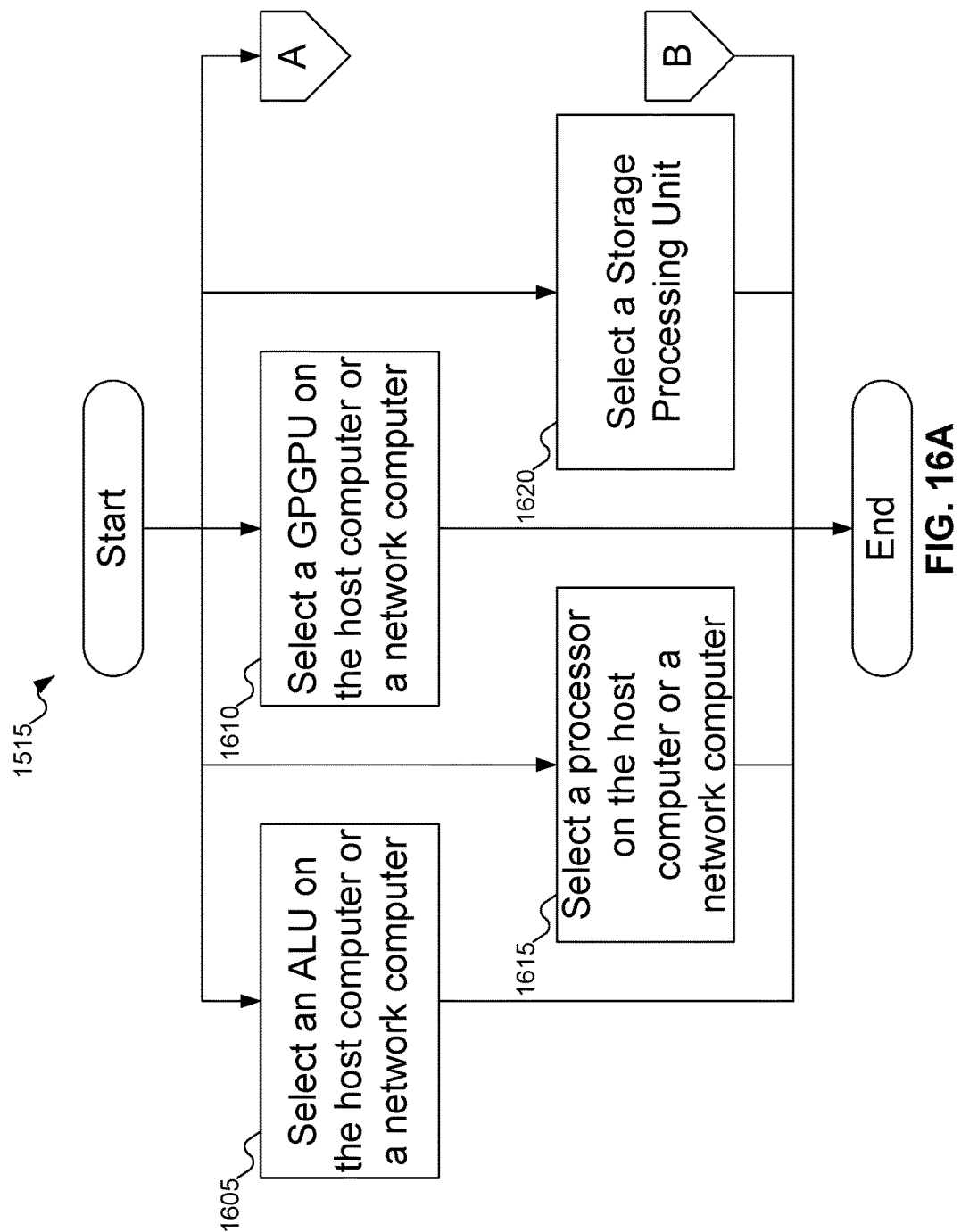
FIGS. 16A-16B show a flowchart of an example procedure for selecting different ALUs for an iteration of the fast, inexact algorithm, according to an embodiment of the inventive concept.
Figure 16B:
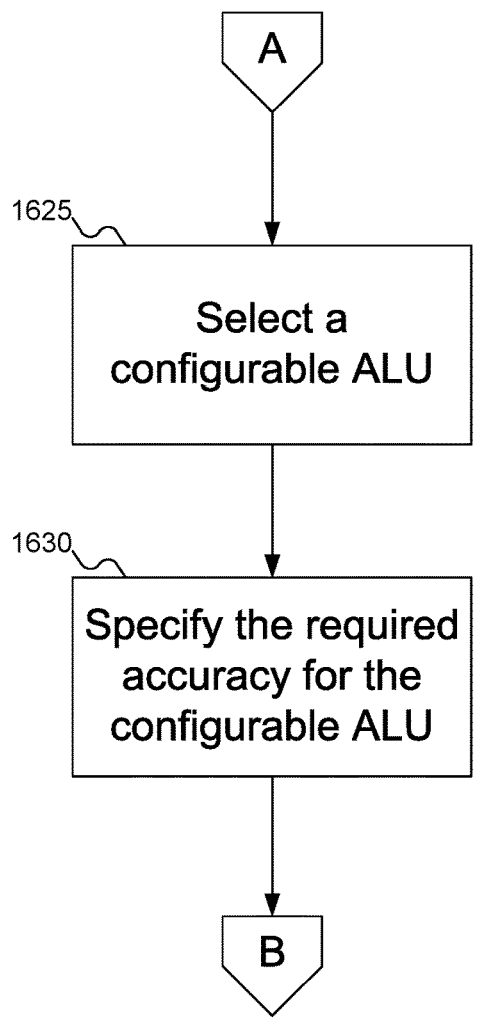

FIGS. 16A-16B show a flowchart of an example procedure for selecting different ALUs for an iteration of the fast, inexact algorithm, according to an embodiment of the inventive concept. In FIG. 16A, at block 1605, adaptive mechanism 125 of FIG. 1 may select an ALU on host computer 705 or network computer 750 of FIG. 7 to execute an iteration of algorithm 130 of FIG. 1. Alternatively, at block 1610, adaptive mechanism 125 of FIG. 1 may select a GPGPU on host computer 705 or network computer 750 of FIG. 7 to execute an iteration of algorithm 130 of FIG. 1. Alternatively, at block 1615, adaptive mechanism 125 of FIG. 1 may select a processor on host computer 705 or network computer 750 of FIG. 7 to execute an iteration of algorithm 130 of FIG. 1. Alternatively, at block 1620, adaptive mechanism 125 of FIG. 1 may select a storage processing unit (SPU) (in-storage computing: that is, an ALU within a storage device such as a Smart SSD) to execute an iteration of algorithm 130 of FIG. 1.

Alternatively, at block 1625 (FIG. 16B), adaptive mechanism 125 of FIG. 1 may select configurable ALU 140-3 of FIG. 11 (wherever located: on a Smart SSD, on host computer 705 of FIG. 7, on network computer 740 of FIG. 7, or elsewhere) to execute an iteration of algorithm 130 of FIG. 1. Then, at block 1630, adaptive mechanism 125 of FIG. 1 may then configure the accuracy of configurable ALU 140-3 of FIG. 11 by specifying the required accuracy (that is, the number of bits to use in computations).

Figure 17:
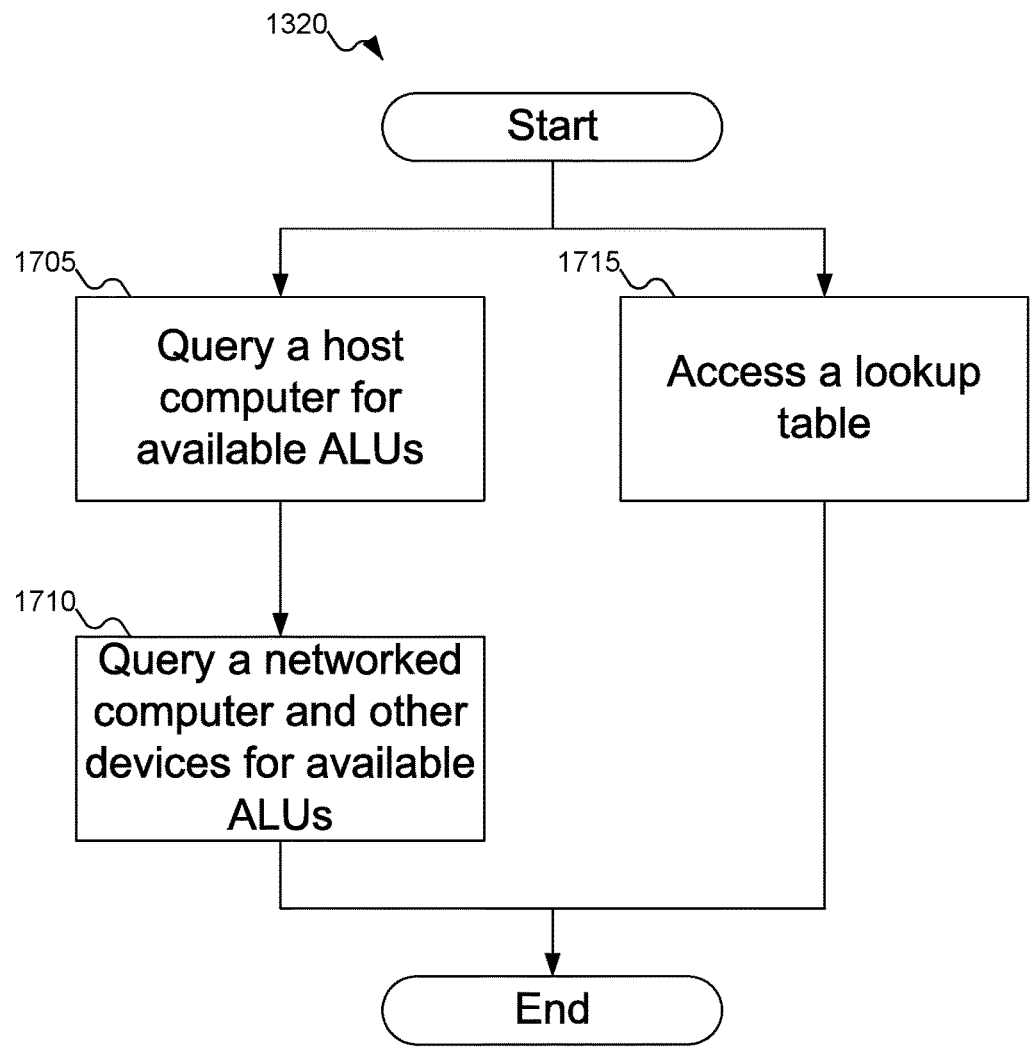
FIG. 17 shows a flowchart of an example procedure for the host computer of FIG. 7 to determine the available ALUs and their accuracy, according to an embodiment of the inventive concept.

FIG. 17 shows a flowchart of a procedure for the host computer of FIG. 7 to determine the available ALUs and their accuracy, according to an embodiment of the inventive concept. In FIG. 17, at block 1705, adaptive mechanism 125 of FIG. 1 may query host computer 705 for what ALUs it has available. Adaptive mechanism 125 of FIG. 1 may also query host computer 705 of FIG. 7 for the accuracies of the available ALUs. At block 1710, adaptive mechanism 125 of FIG. 1 may query network computer 740 of FIG. 7 and other accessible devices (such as Smart SSDs and other devices that include ALUs) for what ALUs they have available. Adaptive mechanism 125 of FIG. 1 may also query network computer 740 of FIG. 7 and the other devices for the accuracies of the available ALUs.

Alternatively, at block 1715, adaptive mechanism 125 of FIG. 1 may access lookup table 815 of FIGS. 8-9 to determine what ALUs are available and their accuracies.

Figure 25:
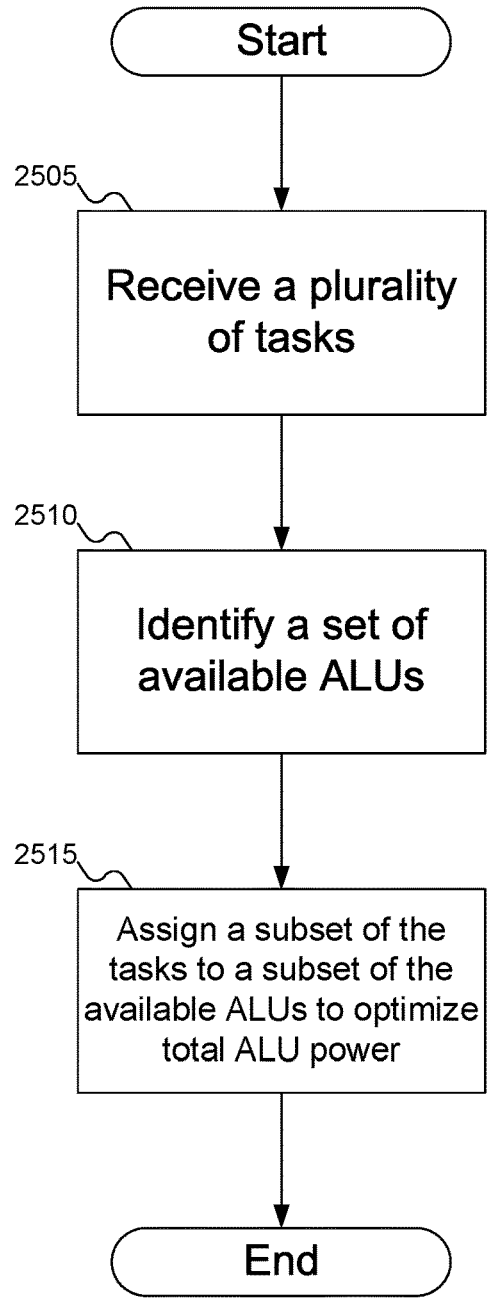
FIG. 25 shows a flowchart of an example procedure for assigning iterations of the inexact algorithms of FIG. 1 to the ALUs of FIG. 18, according to an embodiment of the inventive concept.

FIG. 25 shows a flowchart of an example procedure for assigning iterations of the inexact algorithms of FIG. 1 to the ALUs of FIG. 18, according to an embodiment of the inventive concept. In FIG. 25, at block 2505, receiver 1905 of FIG. 19 may receive a plurality of tasks associated with the various inexact algorithms (or instances thereof). At block 2510, ALU identifier 1910 of FIG. 19 may identify the set of available ALUs. At block 2515, assignment module 1915 of FIG. 19 may assign a subset of the tasks to a subset of the available ALUs. As described above with reference to FIGS. 19 and 21, there may be reasons why particular tasks might not be assigned to any ALU, and why an ALU might be available but not have a task assigned to it. Therefore, in block 2515, the subset of tasks might include fewer than all the tasks awaiting assignment, and the subset of the available ALUs might include fewer than all the available ALUs.

Figure 26A:
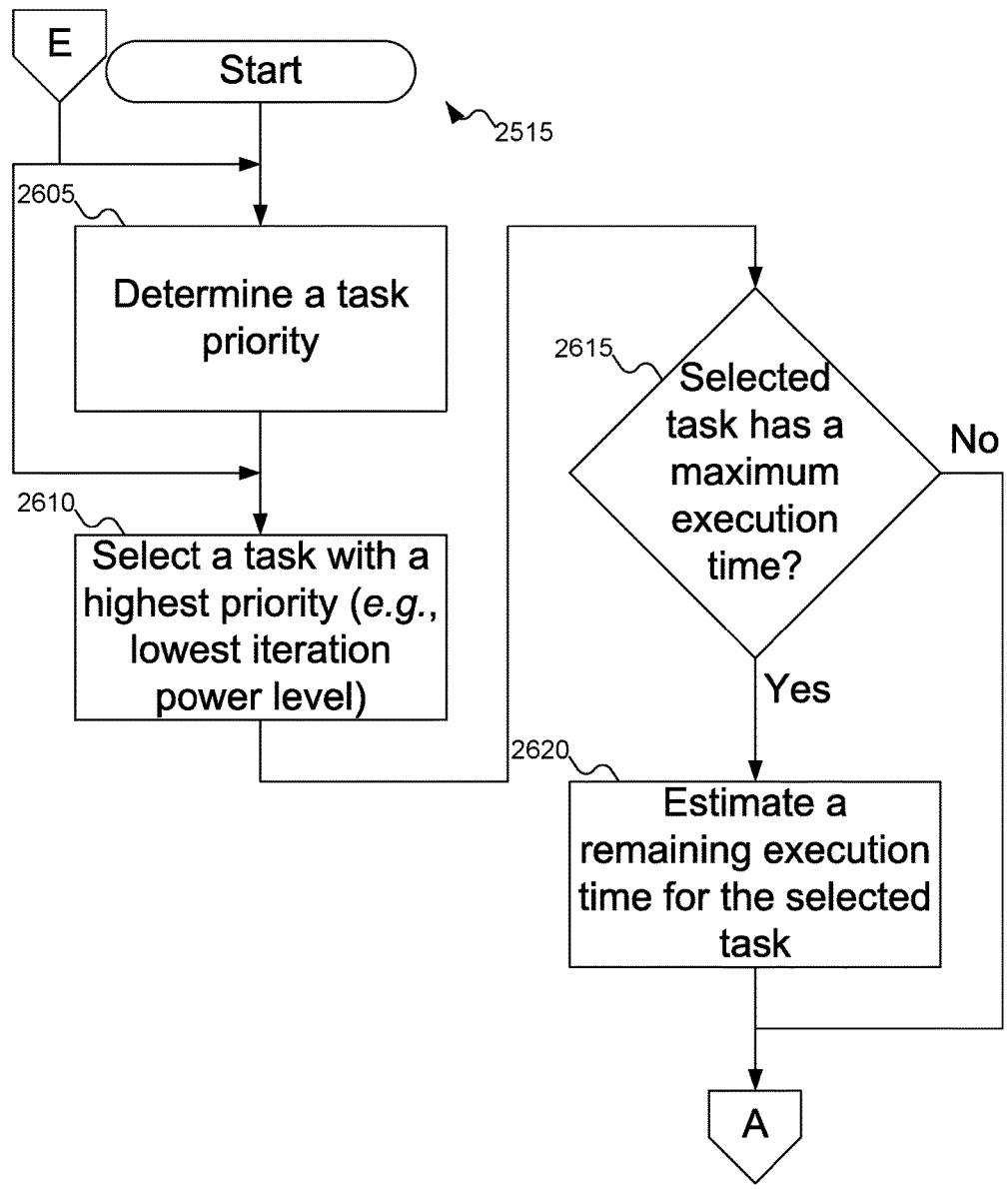
FIGS. 26A-26C show a flowchart of an example procedure for assigning individual iterations of the inexact algorithms of FIG. 1 to the ALUs of FIG. 18, according to an embodiment of the inventive concept.
Figure 26B:
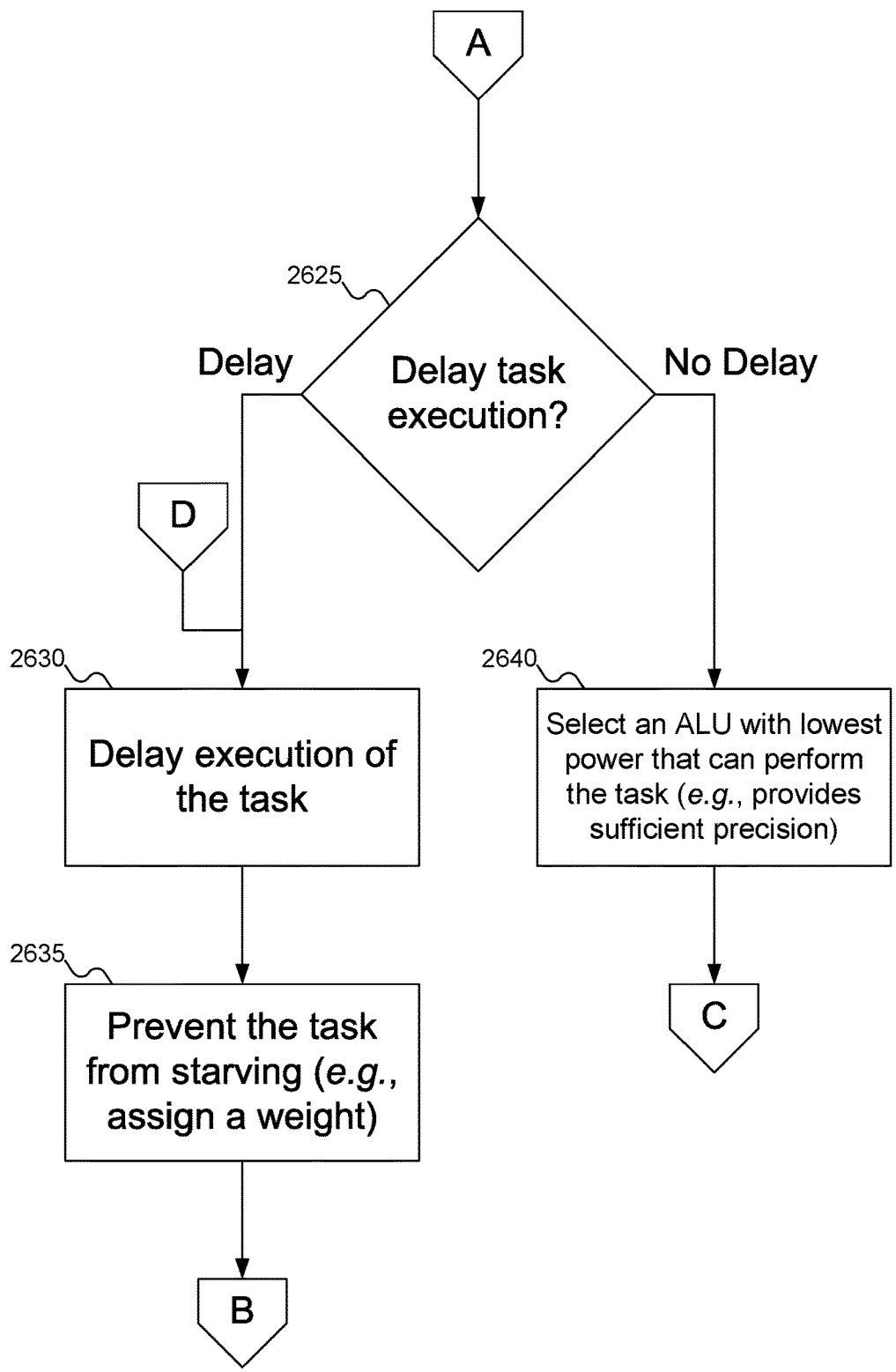
Figure 26C:
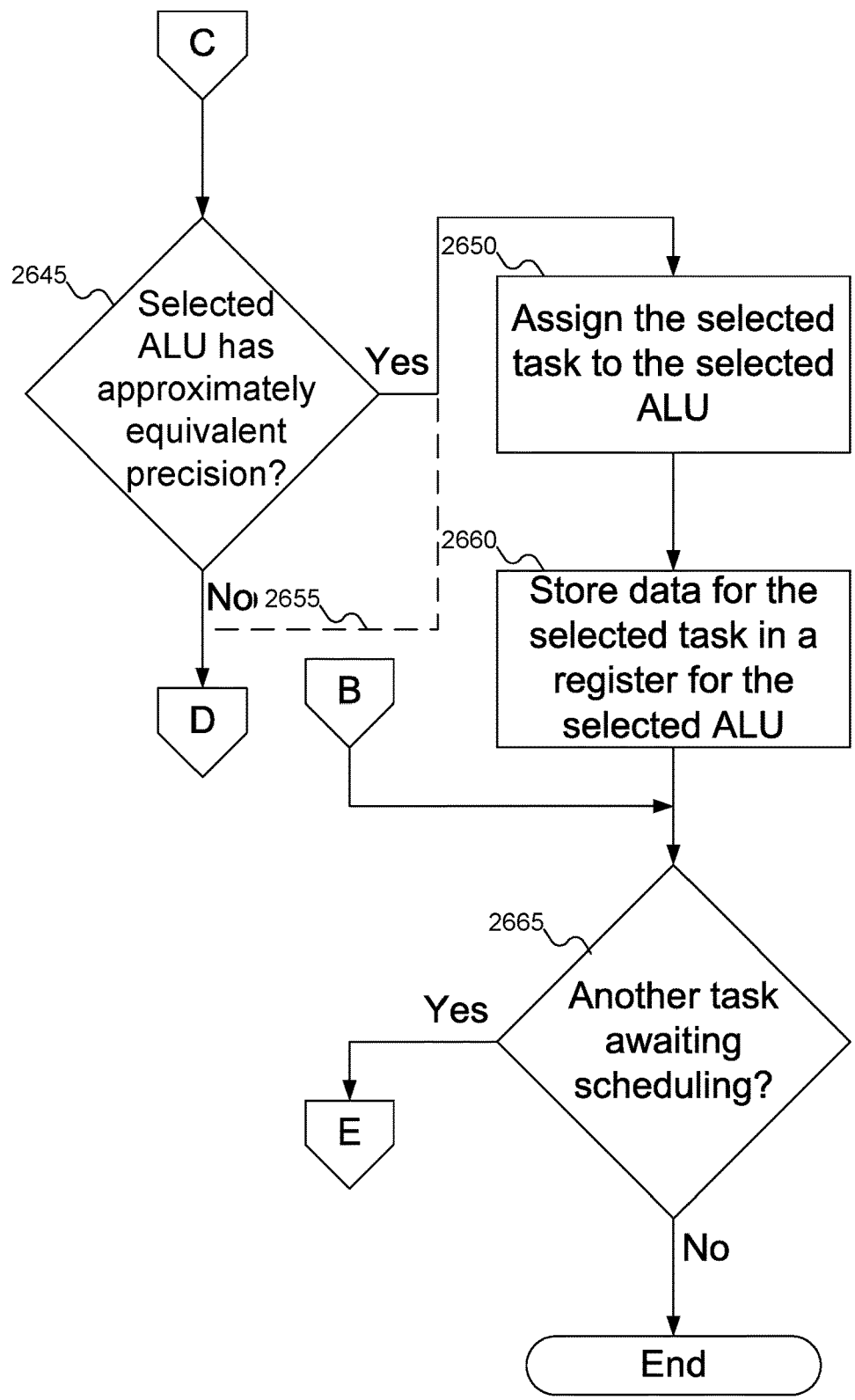

FIGS. 26A-26C show a flowchart of an example procedure for assigning individual iterations of the inexact algorithms of FIG. 1 to the ALUs of FIG. 18, according to an embodiment of the inventive concept. In FIG. 26A, at block 2605, task selector 2205 of FIG. 22 may determine the priority/priorities for one or more tasks awaiting assignment. As described above with reference to FIG. 22, priority may be determined based on any number of criteria, such as power levels, weights, and so on. At block 2610, task selector 2205 of FIG. 22 may select a task with the highest priority. At block 2615, assignment module 1915 of FIG. 19 may determine whether the selected task includes maximum execution time 145 of FIG. 1. If so, then at block 2620, remaining execution time estimator 2215 of FIG. 22 may calculate estimated remaining execution time 2315 of FIG. 23 for the inexact algorithm. But whether or not the inexact algorithm includes maximum execution time 145 of FIG. 1, processing may continue with block 2625 on FIG. 26B.

At block 2625 (FIG. 26B), assignment module 1915 of FIG. 19 may determine whether or not the task is to be delayed. For example, the task might be available to be delayed if it does not have an associated maximum execution time 145 of FIG. 1, or if maximum execution time 145 of FIG. 1 leaves enough time to complete execution of the inexact algorithm within maximum execution time 145 of FIG. 1 with time to spare. (Note that block 2625 does not opt to defer a task due to the lack of an available processor with the appropriate precision: that decision is handled later in the flowchart.) And just because a task is available to be delayed does not mean that the task needs to be delayed. For example, if there are more than enough available ALUs to handle all tasks with sufficient precision (without excessive power consumption), the fact that a particular task may be delayed would not necessarily result in the task being delayed.

If the task is to be delayed, then processing may continue at block 2630, where the task is delayed. At block 2635, assignment module 1915 of FIG. 19 may take measures to prevent the task from starving, such as increasing the task's priority. For example, weighting module 2220 of FIG. 22 may increase the weight of the task for when the task is next considered for ALU assignment. After block 2635, processing may continue with selecting the next task for possible ALU assignment, as described below with reference to FIG. 26C. On the other hand, if the task is not to be delayed, then at block 2640, ALU selector 2210 may select an available ALU with the lowest power level that may perform the task. Block 2640 may also consider how much power is being consumed by the system as a whole, or how much power has been consumed in executing the inexact algorithm to date, in selecting an available ALU for a particular task.

At block 2645 (FIG. 26C), assignment module 1915 of FIG. 19 may determine if the selected ALU has a precision that is approximately equivalent to the requirements of the task. For example, as described above with reference to FIG. 21, it might be that the only ALU(s) available to perform the task have either insufficient precision or excessive power consumption. But the decision whether or not to defer a task due to there not being an available ALU with approximately the needed precision balances the competing objectives of minimizing power consumption and completing all inexact algorithms as quickly as possible. If the only ALUs available have significantly greater precision than that needed for the task, it might be preferable to defer the task or execute the task anyway.

If the decision is to defer execution of the task, then processing may continue at block 2630 of FIG. 26B. Otherwise, processing may continue at block 2650, where assignment module 1915 of FIG. 19 may assign the task to the selected ALU. Note that dashed arrow 2655 shows that the task may be assigned to the ALU even if the ALU does not have approximately the needed precision, as described above.

At block 2660, data for the task may be stored in a register for the selected ALU, after which the ALU may begin to perform the task. Processing for adaptive mechanism 125 of FIG. 19 may then continue at block 2665, where adaptive mechanism 125 of FIG. 19 may determine if there are any further tasks awaiting assignment to an ALU. (Block 2665 may be performed in parallel with blocks 2605-2610: in fact, the operation of adaptive mechanism 125 of FIG. 19 as a whole may be parallelized to improve performance, since the most significant impact parallelizing would have on the operation of adaptive mechanism 125 of FIG. 19 is that once a task has been assigned to an available ALU in block 2650, that ALU is not available for selection in block 2640 of FIG. 26B until the ALU completes processing of the assigned task.) (Processing for adaptive mechanism 125 of FIG. 19 also continues at block 2665 after a task was delayed at blocks 2630 and 2635 of FIG. 26B.) If there is another task awaiting assignment to an ALU, then processing may continue at blocks 2605 or 2610 of FIG. 26A (depending on whether or not task priorities need to be recalculated). Otherwise, processing is "complete" (although in practice adaptive mechanism 125 of FIG. 19 would just wait until a new task was received by receiver 1905 of FIG. 19, then restart processing at block 2605 of FIG. 26A).

As described above with reference to FIG. 18, a single ALU might support performing multiple tasks at the same time. If the ALU does not require synchronous operations for the multiple tasks, FIGS. 26A-26C may be used without modification. But if the ALU requires that the operations be synchronized across all data being used, then FIGS. 26A-26C may be modified to support assigning multiple tasks to a single ALU. For example, block 2610 of FIG. 26A may be modified to select two (or more) tasks with the same fingerprint, block 2615 of FIG. 26A may be modified to check whether any of the selected tasks have maximum execution times, and blocks 2630-2635 of FIG. 26B may be modified to delay and weight all of the selected tasks (or to treat them as separate tasks not assigned to the same ALU, if some are to be delayed and others not).

Figure 27:
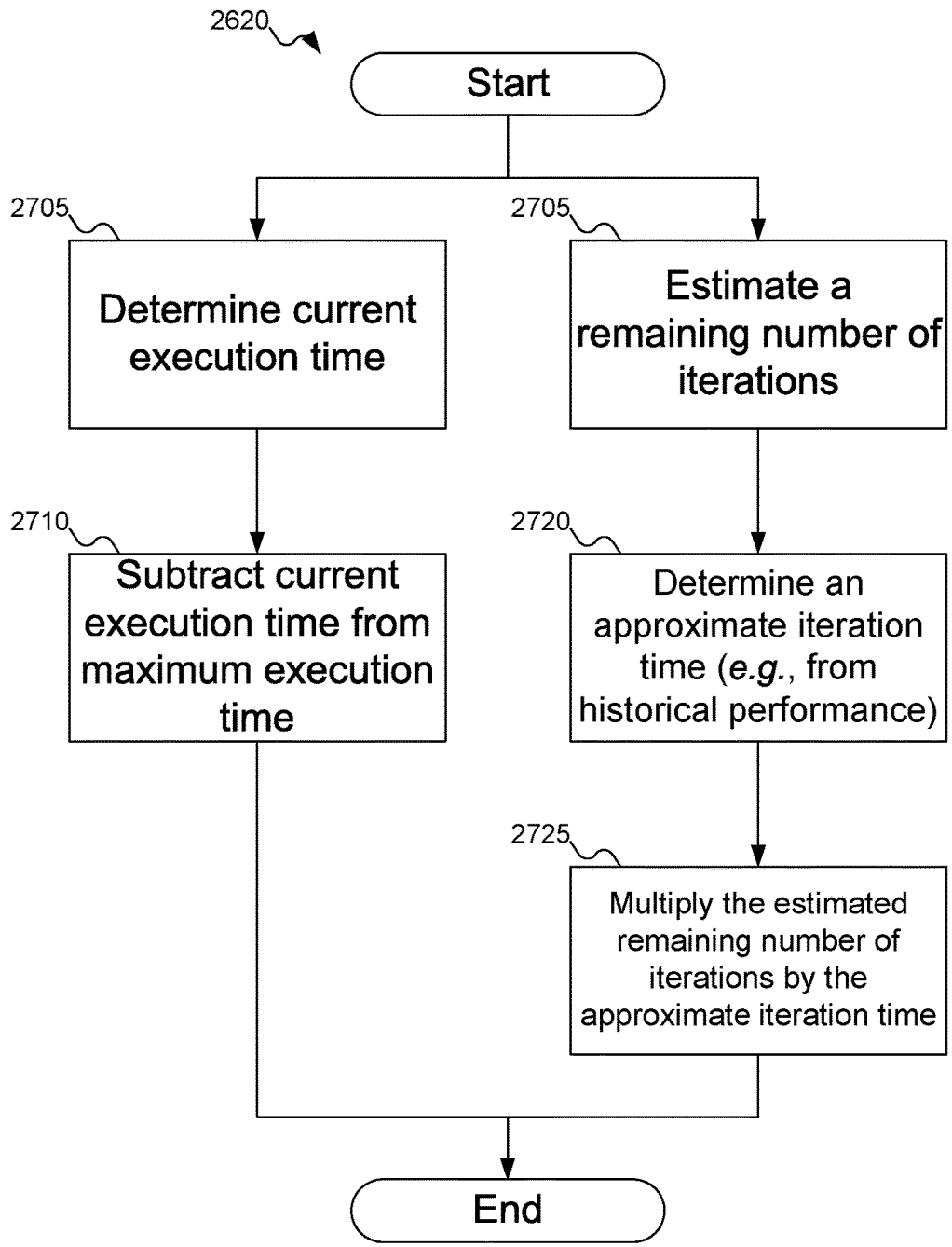
FIG. 27 shows a flowchart of an example procedure for estimating the remaining execution time of one of the inexact algorithms of FIG. 1, according to an embodiment of the inventive concept.

FIG. 27 shows a flowchart of an example procedure for estimating the remaining execution time of one of the inexact algorithms of FIG. 1, according to an embodiment of the inventive concept. In FIG. 27, at block 2705, current execution timer 2405 of FIG. 24A may determine current execution time 2410, and at block 2710, remaining execution time estimator 2215 of FIG. 22 may compute estimated remaining execution time 2315 of FIG. 24A as the difference between maximum execution time 145 of FIG. 1 and current execution time 2410 of FIG. 24A.

Alternatively, at block 2715, iteration number estimator 2415 of FIG. 24B may determine estimated remaining number of iterations 2305 of FIG. 24B. At block 2720, remaining execution time estimator 2215 of FIG. 24B may determine approximate iteration time 2430 of FIG. 24B, and at block 2725, remaining execution time estimator 2215 of FIG. 24B may determine estimate remaining execution time 2315 of FIG. 24B as the product of approximate iteration time 2430 of FIG. 24B and estimated remaining number of iterations 2305 of FIG. 24B.

In FIGS. 13-17 and 25-27, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. Typically, the machine or machines include a system bus to which is attached processors, memory, e.g., random access memory (RAM), read-only memory (ROM), or other state preserving medium, storage devices, a video interface, and input/output interface ports. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes an adaptive mechanism, comprising:
a receiver to receive a plurality of tasks, each task representing an iteration of an inexact algorithm and including a corresponding iteration power level;
an Arithmetic Logic Unit (ALU) identifier to identify a set of available ALUs, each ALU including a corresponding ALU power level; and
an assignment module to assign at least a subset of the plurality of tasks to a subset of the set of available ALUs in order to optimize a total ALU power used by the subset of the set of available ALUs.

Statement 2. An embodiment of the inventive concept includes an adaptive mechanism according to statement 1, wherein each of the set of available ALUs is drawn from a set including a processor, an ALU on a host computer, an ALU on a network computer, a General-Purpose Computing on Graphics Processing Unit (GPGPU) on the host computer, a GPGPU on the network computer, a Field Programmable Gate Array (FPGA) on the host computer, a FPGA on the network computer, a System-on-a-Chip (SoC) on the host computer, a SoC on the network computer, a Tensor Processing Unit (TPU) on the host computer, a TPU on the network computer, and an In-Storage Computing (ISC) processor on a storage device.

Statement 3. An embodiment of the inventive concept includes an adaptive mechanism according to statement 1, wherein at least one ALU in the set of available ALUs includes multiple corresponding ALU power levels.

Statement 4. An embodiment of the inventive concept includes an adaptive mechanism according to statement 3, wherein the multiple corresponding ALU power levels correspond to different precisions supported by the at least one ALU in the set of available ALUs.

Statement 5. An embodiment of the inventive concept includes an adaptive mechanism according to statement 1, wherein:
the assignment module includes:
a task selector to select a first task in the plurality of tasks with a highest priority; and
an ALU selector to select a first ALU in the set of available ALUs with a lowest corresponding ALU power level; and the assignment module is operative to assign the first task in the plurality of tasks with the highest priority to the first ALU in the set of available ALUs with the lowest corresponding ALU power level.

Statement 6. An embodiment of the inventive concept includes an adaptive mechanism according to statement 5, wherein the task selector is operative to select the first task in the plurality of tasks with a lowest corresponding iteration power level as the first task in the plurality of tasks with the highest priority.

Statement 7. An embodiment of the inventive concept includes an adaptive mechanism according to statement 5, wherein:
each task representing an iteration of an inexact algorithm further includes a corresponding iteration precision;
each ALU further includes a corresponding ALU precision; and
the ALU selector is operative to select the first ALU in the set of available ALUs with the lowest corresponding ALU power level and the corresponding ALU precision that is greater than the corresponding iteration precision.

Statement 8. An embodiment of the inventive concept includes an adaptive mechanism according to statement 7, wherein:
a first inexact algorithm includes a maximum execution time; and
the assignment module is operative to assign the first task of the first inexact algorithm to the first ALU in the set of available ALUs with the lowest corresponding ALU power level in order to optimize the total ALU power used by the subset of the set of available ALUs and to ensure that the first inexact algorithm does not take longer than the maximum execution time to complete.

Statement 9. An embodiment of the inventive concept includes an adaptive mechanism according to statement 8, wherein:
the assignment module further includes a remaining execution time estimator to estimate an estimate remaining execution time for the first inexact algorithm; and
the assignment module is operative to not assign a second task representing an iteration of the first inexact algorithm to any ALU in the set of available ALUs if the estimated remaining execution time would permit delayed execution of the second task.

Statement 10. An embodiment of the inventive concept includes an adaptive mechanism according to statement 9, wherein the assignment module is operative to prevent the second task from starving.

Statement 11. An embodiment of the inventive concept includes an adaptive mechanism according to statement 10, wherein:
the assignment module further includes a weighting module to assign a weight to the second task; and
the task selector is operative to select the first task in the plurality of tasks responsive to at least one of the corresponding iteration power level and a corresponding weight.

Statement 12. An embodiment of the inventive concept includes an adaptive mechanism according to statement 9, wherein the assignment module is operative to not assign the second task representing an iteration of the first inexact algorithm to any ALU in the set of available ALUs even if the estimated remaining execution time would not permit delayed execution of the second task.

Statement 13. An embodiment of the inventive concept includes an adaptive mechanism according to statement 12, wherein the assignment module is operative to prevent the second task from starving.

Statement 14. An embodiment of the inventive concept includes an adaptive mechanism according to statement 13, wherein:

the assignment module includes a weighting module to assign a weight to the second task; and the task selector is operative to select the first task in the plurality of tasks responsive to at least one of the corresponding iteration power level and a corresponding weight.

Statement 15. An embodiment of the inventive concept includes an adaptive mechanism according to statement 9, wherein the remaining execution time estimator includes:

a current execution timer to determine a current execution time for the first inexact algorithm; and a processor to subtract the current execution time for the first inexact algorithm from the maximum execution time for the first inexact algorithm to calculate the estimated remaining execution time.

Statement 16. An embodiment of the inventive concept includes an adaptive mechanism according to statement 9, wherein the remaining execution time estimator includes:

an iteration number estimator to estimate a remaining number of iterations for the first inexact algorithm; and a processor to multiply the remaining number of iterations by an approximate iteration time to calculate the estimated remaining execution time.

Statement 17. An embodiment of the inventive concept includes an adaptive mechanism according to statement 16, wherein the iteration number estimator includes:

a memory storing a mean number of iterations historically used in executing the first inexact algorithm; and a processor to subtract a counter of a number of iterations of the first inexact algorithm from the mean number of iterations to calculate the remaining number of iterations.

Statement 18. An embodiment of the inventive concept includes an adaptive mechanism according to statement 7, wherein the assignment module is operative to assign a second task in the plurality of tasks to no ALU in the set of available ALUs if no ALU in the set of available ALUs includes the corresponding ALU precision approximately equivalent to the iteration precision corresponding to the second task.

Statement 19. An embodiment of the inventive concept includes an adaptive mechanism according to statement 7, wherein the assignment module is operative to assign a second task in the plurality of tasks to a second ALU in the set of available ALUs, the second ALU including a lower corresponding precision than the iteration precision corresponding to the second task, if no ALU in the set of available ALUs includes the corresponding ALU precision approximately equivalent to the iteration precision corresponding to the second task.

Statement 20. An embodiment of the inventive concept includes an adaptive mechanism according to statement 1, wherein at least one ALU in the set of available ALUs supports parallel execution of multiple tasks.

Statement 21. An embodiment of the inventive concept includes an adaptive mechanism according to statement 20, wherein:

the assignment module includes:
a task selector to select at least two tasks in the plurality of tasks; and
an ALU selector to select the at least one ALU in the set of available ALUs; and the assignment module is operative to assign each of the at least two tasks to the at least one ALU in the set of available ALUs.

Statement 22. An embodiment of the inventive concept includes an adaptive mechanism according to statement 21, wherein:

the at least one ALU includes at least two processors; and the assignment module is operative to assign each of the at least two tasks to different processors in the at least one ALU.

Statement 23. An embodiment of the inventive concept includes an adaptive mechanism according to statement 21, wherein:

the at least one ALU supports a register large enough to contain data for each of the at least two tasks; and the assignment module is operative to store data for each of the at least two tasks in the register for the at least one ALU.

Statement 24. An embodiment of the inventive concept includes an adaptive mechanism according to statement 21, wherein each of the at least two tasks includes a similar instruction set.

Statement 25. An embodiment of the inventive concept includes a method, comprising:

receiving a plurality of tasks, each task representing an iteration of an inexact algorithm and including a corresponding iteration power level;

identifying a set of available Arithmetic Logic Units (ALUs), each ALU including a corresponding ALU power level; and assigning at least a subset of the plurality of tasks to a subset of the set of available ALUs, wherein the assignment of the subset of the plurality of tasks to the subset of the set of available ALUs optimizes a total ALU power used by the subset of the set of available ALUs.

Statement 26. An embodiment of the inventive concept includes a method according to statement 25, wherein each of the set of available ALUs is drawn from a set including a processor, an ALU on a host computer, an ALU on a network computer, a General-Purpose Computing on Graphics Processing Unit (GPGPU) on the host computer, a GPGPU on the network computer, a Field Programmable Gate Array (FPGA) on the host computer, a FPGA on the network computer, a System-on-a-Chip (SoC) on the host computer, a SoC on the network computer, a Tensor Processing Unit (TPU) on the host computer, a TPU on the network computer, and an In-Storage Computing (ISC) processor on a storage device.

Statement 27. An embodiment of the inventive concept includes a method according to statement 25, wherein at least one ALU in the set of available ALUs includes multiple corresponding ALU power levels.

Statement 28. An embodiment of the inventive concept includes a method according to statement 27, wherein the multiple corresponding ALU power levels correspond to different precisions supported by the at least one ALU in the set of available ALUs.

Statement 29. An embodiment of the inventive concept includes a method according to statement 25, wherein assigning at least a subset of the plurality of tasks to a subset of the set of available ALUs includes:

selecting a first task in the plurality of tasks with a highest priority;

selecting a first ALU in the set of available ALUs with a lowest corresponding ALU power level; and assigning the first task in the plurality of tasks with the highest priority to the first ALU in the set of available ALUs with the lowest corresponding ALU power level.

Statement 30. An embodiment of the inventive concept includes a method according to statement 29, wherein selecting a first task in the plurality of tasks with a highest priority includes selecting the first task in the plurality of tasks with a lowest corresponding iteration power level.

Statement 31. An embodiment of the inventive concept includes a method according to statement 29, wherein:
each task representing an iteration of an inexact algorithm further includes a corresponding iteration precision;
each ALU further includes a corresponding ALU precision; and
selecting a first ALU in the set of available ALUs with a lowest corresponding ALU power level includes selecting the first ALU in the set of available ALUs with the lowest corresponding ALU power level and the corresponding ALU precision that is greater than the corresponding iteration precision.

Statement 32. An embodiment of the inventive concept includes a method according to statement 31, wherein:
a first inexact algorithm includes a maximum execution time,
wherein the assignment of the subset of the plurality of tasks to the subset of the set of available ALUs optimizes the total ALU power used by the subset of the set of available ALUs and the first inexact algorithm does not take longer than the maximum execution time to complete.

Statement 33. An embodiment of the inventive concept includes a method according to statement 32, wherein assigning at least a subset of the plurality of tasks to a subset of the set of available ALUs further includes:
estimating an estimated remaining execution time for the first inexact algorithm; and
not assigning a second task representing an iteration of the first inexact algorithm to any ALU in the set of available ALUs if the estimated remaining execution time would permit delayed execution of the second task.

Statement 34. An embodiment of the inventive concept includes a method according to statement 33, wherein not assigning a second task representing an iteration of the first inexact algorithm to any ALU in the set of available ALUs includes preventing the second task from starving.

Statement 35. An embodiment of the inventive concept includes a method according to statement 34, wherein:
preventing the second task from starving includes assigning a weight to the second task; and
selecting a first task in the plurality of tasks with a highest priority includes determining a priority for each task in the plurality of tasks responsive to at least one of the corresponding iteration power level and a corresponding weight.

Statement 36. An embodiment of the inventive concept includes a method according to statement 33, wherein assigning at least a subset of the plurality of tasks to a subset of the set of available ALUs further includes not assigning the second task representing an iteration of the first inexact algorithm to any ALU in the set of available ALUs even if the estimated remaining execution time would not permit delayed execution of the second task.

Statement 37. An embodiment of the inventive concept includes a method according to statement 36, wherein not assigning a second task representing an iteration of the first inexact algorithm to any ALU in the set of available ALUs includes preventing the second task from starving.

Statement 38. An embodiment of the inventive concept includes a method according to statement 37, wherein:
preventing the second task from starving includes assigning a weight to the second task; and
selecting a first task in the plurality of tasks with a highest priority includes determining a priority for each task in the plurality of tasks responsive to at least one of the corresponding iteration power level and a corresponding weight.

Statement 39. An embodiment of the inventive concept includes a method according to statement 33, wherein estimating an estimated remaining execution time for the first inexact algorithm includes:
determining a current execution time for the first inexact algorithm; and
subtracting the current execution time for the first inexact algorithm from the maximum execution time for the first inexact algorithm to calculate the estimated remaining execution time.

Statement 40. An embodiment of the inventive concept includes a method according to statement 33, wherein estimating an estimated remaining execution time for the first inexact algorithm includes:
estimating a remaining number of iterations for the first inexact algorithm; and
multiplying the remaining number of iterations by an approximate iteration time to calculate the estimated remaining execution time.

Statement 41. An embodiment of the inventive concept includes a method according to statement 40, wherein estimating an estimated remaining execution time for the first inexact algorithm further includes determining the approximate iteration time from historical performance of the first inexact algorithm.

Statement 42. An embodiment of the inventive concept includes a method according to statement 31, wherein assigning at least a subset of the plurality of tasks to a subset of the set of available ALUs further includes not assigning a second task in the plurality of tasks to any ALU in the set of available ALUs if no ALU in the set of available ALUs includes the corresponding ALU precision approximately equivalent to the iteration precision corresponding to the second task.

Statement 43. An embodiment of the inventive concept includes a method according to statement 31, wherein assigning at least a subset of the plurality of tasks to a subset of the set of available ALUs further includes assigning a second task in the plurality of tasks to a second ALU in the set of available ALUs, the second ALU including a lower corresponding precision than the iteration precision corresponding to the second task, if no ALU in the set of available ALUs includes the corresponding ALU precision approximately equivalent to the iteration precision corresponding to the second task.

Statement 44. An embodiment of the inventive concept includes a method according to statement 29, further comprising selecting the first task, selecting the first ALU, and assigning the first task to the first ALU a plurality of times.

Statement 45. An embodiment of the inventive concept includes a method according to statement 25, wherein at least one ALU in the set of available ALUs supports parallel execution of multiple tasks.

Statement 46. An embodiment of the inventive concept includes a method according to statement 45, wherein assigning at least a subset of the plurality of tasks to a subset of the set of available ALUs includes:
selecting at least two tasks in the plurality of tasks;
selecting the at least one ALU in the set of available ALUs; and
assigning each of the at least two tasks to the at least one ALU.

Statement 47. An embodiment of the inventive concept includes a method according to statement 46, wherein:

the at least one ALU includes at least two processors; and assigning each of the at least two tasks to the at least one ALU includes assigning each of the at least two tasks to different processors in the at least two processors of the at least one ALU.

Statement 48. An embodiment of the inventive concept includes a method according to statement 46, wherein:

the at least one ALU supports a register large enough to contain data for each of the at least two tasks; and assigning each of the at least two tasks to the at least one ALU includes storing data for each of the at least two tasks in the register for the at least one ALU.

Statement 49. An embodiment of the inventive concept includes a method according to statement 46, wherein each of the at least two tasks includes a similar instruction set.

Statement 50. An embodiment of the inventive concept includes an article, comprising a non-transitory storage medium, the non-transitory storage medium having stored thereon instructions that, when executed by a machine, result in:

receiving a plurality of tasks, each task representing an iteration of an inexact algorithm and including a corresponding iteration power level;

identifying a set of available Arithmetic Logic Units (ALUs), each ALU including a corresponding ALU power level; and assigning at least a subset of the plurality of tasks to a subset of the set of available ALUs, wherein the assignment of the subset of the plurality of tasks to the subset of the set of available ALUs optimizes a total ALU power used by the subset of the set of available ALUs.

Statement 51. An embodiment of the inventive concept includes an article according to statement 50, wherein each of the set of available ALUs is drawn from a set including a processor, an ALU on a host computer, an ALU on a network computer, a General-Purpose Computing on Graphics Processing Unit (GPGPU) on the host computer, a GPGPU on the network computer, a Field Programmable Gate Array (FPGA) on the host computer, a FPGA on the network computer, a System-on-a-Chip (SoC) on the host computer, a SoC on the network computer, a Tensor Processing Unit (TPU) on the host computer, a TPU on the network computer, and an In-Storage Computing (ISC) processor on a storage device.

Statement 52. An embodiment of the inventive concept includes an article according to statement 50, wherein at least one ALU in the set of available ALUs includes multiple corresponding ALU power levels.

Statement 53. An embodiment of the inventive concept includes an article according to statement 52, wherein the multiple corresponding ALU power levels correspond to different precisions supported by the at least one ALU in the set of available ALUs.

Statement 54. An embodiment of the inventive concept includes an article according to statement 50, wherein assigning at least a subset of the plurality of tasks to a subset of the set of available ALUs includes:

selecting a first task in the plurality of tasks with a highest priority;

selecting a first ALU in the set of available ALUs with a lowest corresponding ALU power level; and assigning the first task in the plurality of tasks with the highest priority to the first ALU in the set of available ALUs with the lowest corresponding ALU power level.

Statement 55. An embodiment of the inventive concept includes an article according to statement 54, wherein selecting a first task in the plurality of tasks with a highest priority includes selecting the first task in the plurality of tasks with a lowest corresponding iteration power level.

Statement 56. An embodiment of the inventive concept includes an article according to statement 54, wherein:

each task representing an iteration of an inexact algorithm further includes a corresponding iteration precision;

each ALU further includes a corresponding ALU precision; and selecting a first ALU in the set of available ALUs with a lowest corresponding ALU power level includes selecting the first ALU in the set of available ALUs with the lowest corresponding ALU power level and the corresponding ALU precision that is greater than the corresponding iteration precision.

Statement 57. An embodiment of the inventive concept includes an article according to statement 56, wherein:

a first inexact algorithm includes a maximum execution time, wherein the assignment of the subset of the plurality of tasks to the subset of the set of available ALUs optimizes the total ALU power used by the subset of the set of available ALUs and the first inexact algorithm does not take longer than the maximum execution time to complete.

Statement 58. An embodiment of the inventive concept includes an article according to statement 57, wherein assigning at least a subset of the plurality of tasks to a subset of the set of available ALUs further includes:

estimating an estimated remaining execution time for the first inexact algorithm; and not assigning a second task representing an iteration of the first inexact algorithm to any ALU in the set of available ALUs if the estimated remaining execution time would permit delayed execution of the second task.

Statement 59. An embodiment of the inventive concept includes an article according to statement 58, wherein not assigning a second task representing an iteration of the first inexact algorithm to any ALU in the set of available ALUs includes preventing the second task from starving.

Statement 60. An embodiment of the inventive concept includes an article according to statement 59, wherein:

preventing the second task from starving includes assigning a weight to the second task; and selecting a first task in the plurality of tasks with a highest priority includes determining a priority for each task in the plurality of tasks responsive to at least one of the corresponding iteration power level and a corresponding weight.

Statement 61. An embodiment of the inventive concept includes an article according to statement 58, wherein assigning at least a subset of the plurality of tasks to a subset of the set of available ALUs further includes not assigning the second task representing an iteration of the first inexact algorithm to any ALU in the set of available ALUs even if the estimated remaining execution time would not permit delayed execution of the second task.

Statement 62. An embodiment of the inventive concept includes an article according to statement 61, wherein not assigning a second task representing an iteration of the first inexact algorithm to any ALU in the set of available ALUs includes preventing the second task from starving.

Statement 63. An embodiment of the inventive concept includes an article according to statement 62, wherein:

preventing the second task from starving includes assigning a weight to the second task; and selecting a first task in the plurality of tasks with a highest priority includes determining a priority for each task in the plurality of tasks responsive to at least one of the corresponding iteration power level and a corresponding weight.

Statement 64. An embodiment of the inventive concept includes an article according to statement 58, wherein estimating an estimated remaining execution time for the first inexact algorithm includes:

determining a current execution time for the first inexact algorithm; and subtracting the current execution time for the first inexact algorithm from the maximum execution time for the first inexact algorithm to calculate the estimated remaining execution time.

Statement 65. An embodiment of the inventive concept includes an article according to statement 58, wherein estimating an estimated remaining execution time for the first inexact algorithm includes:

estimating a remaining number of iterations for the first inexact algorithm; and multiplying the remaining number of iterations by an approximate iteration time to calculate the estimated remaining execution time.

Statement 66. An embodiment of the inventive concept includes an article according to statement 65, wherein estimating an estimated remaining execution time for the first inexact algorithm further includes determining the approximate iteration time from historical performance of the first inexact algorithm.

Statement 67. An embodiment of the inventive concept includes an article according to statement 56, wherein assigning at least a subset of the plurality of tasks to a subset of the set of available ALUs further includes not assigning a second task in the plurality of tasks to any ALU in the set of available ALUs if no ALU in the set of available ALUs includes the corresponding ALU precision approximately equivalent to the iteration precision corresponding to the second task.

Statement 68. An embodiment of the inventive concept includes an article according to statement 56, wherein assigning at least a subset of the plurality of tasks to a subset of the set of available ALUs further includes assigning a second task in the plurality of tasks to a second ALU in the set of available ALUs, the second ALU including a lower corresponding precision than the iteration precision corresponding to the second task, if no ALU in the set of available ALUs includes the corresponding ALU precision approximately equivalent to the iteration precision corresponding to the second task.

Statement 69. An embodiment of the inventive concept includes an article according to statement 54, the non-transitory storage medium has stored thereon further instructions that, when executed by the machine, result in selecting the first task, selecting the first ALU, and assigning the first task to the first ALU a plurality of times.

Statement 70. An embodiment of the inventive concept includes an article according to statement 50, wherein at least one ALU in the set of available ALUs supports parallel execution of multiple tasks.

Statement 71. An embodiment of the inventive concept includes an article according to statement 70, wherein assigning at least a subset of the plurality of tasks to a subset of the set of available ALUs includes:

selecting at least two tasks in the plurality of tasks;

selecting the at least one ALU in the set of available ALUs; and assigning each of the at least two tasks to the at least one ALU.

Statement 72. An embodiment of the inventive concept includes an article according to statement 71, wherein:

the at least one ALU includes at least two processors; and assigning each of the at least two tasks to the at least one ALU includes assigning each of the at least two tasks to different processors in the at least two processors of the at least one ALU.

Statement 73. An embodiment of the inventive concept includes an article according to statement 71, wherein:

the at least one ALU supports a register large enough to contain data for each of the at least two tasks; and assigning each of the at least two tasks to the at least one ALU includes storing data for each of the at least two tasks in the register for the at least one ALU.

Statement 74. An embodiment of the inventive concept includes an article according to statement 71, wherein each of the at least two tasks includes a similar instruction set.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. An adaptive mechanism, comprising:
a receiver to receive a plurality of tasks, each task representing an iteration of an inexact algorithm and including a corresponding iteration power level and a corresponding iteration precision, the receiver implemented at least in part using a processor;
an Arithmetic Logic Unit (ALU) identifier to identify a set of available ALUs, each ALU including a corresponding ALU power level and a corresponding ALU precision; and
an assignment module to assign at least a subset of the plurality of tasks to a subset of the set of available ALUs in order to optimize a total ALU power used by the subset of the set of available ALUs and to assign a first task in the plurality of tasks to an ALU with the corresponding ALU precision that is greater than the corresponding iteration precision of the first task, the assignment module implemented at least in part using the processor.

2. An adaptive mechanism according to claim 1, wherein each of the set of available ALUs is drawn from a set including the processor, an ALU on a host computer, an ALU on a network computer, a General-Purpose Computing on Graphics Processing Unit (GPGPU) on the host computer, a GPGPU on the network computer, a Field Programmable Gate Array (FPGA) on the host computer, a FPGA on the network computer, a System-on-a-Chip (SoC) on the host computer, a SoC on the network computer, a Tensor Processing Unit (TPU) on the host computer, a TPU on the network computer, and an In-Storage Computing (ISC) processor on a storage device.

3. An adaptive mechanism according to claim 1, wherein at least one ALU in the set of available ALUs includes multiple corresponding ALU power levels.

4. An adaptive mechanism according to claim 3, wherein the multiple corresponding ALU power levels correspond to different precisions supported by the at least one ALU in the set of available ALUs.

5. An adaptive mechanism according to claim 1, wherein:
the assignment module includes:
  a task selector to select the first task in the plurality of tasks with a lowest corresponding iteration power level; and
  an ALU selector to select a first ALU in the set of available ALUs with a lowest corresponding ALU power level and the corresponding ALU precision that is greater than the corresponding iteration precision of the first task; and
the assignment module is operative to assign the first task in the plurality of tasks with the lowest corresponding iteration power level to the first ALU in the set of available ALUs.

6. An adaptive mechanism according to claim 5, wherein the assignment module is operative to assign a second task in the plurality of tasks to no ALU in the set of available ALUs based at least in part on no ALU in the set of available ALUs including the corresponding ALU precision approximately equivalent to the corresponding iteration precision of the second task.

7. An adaptive mechanism according to claim 5, wherein the assignment module is operative to assign a second task in the plurality of tasks to a second ALU in the set of available ALUs, the second ALU including a lower corresponding ALU precision than the corresponding iteration precision of the second task, based at least in part on no ALU in the set of available ALUs including the corresponding ALU precision approximately equivalent to the corresponding iteration precision of the second task.

8. An adaptive mechanism according to claim 1, wherein at least one ALU in the set of available ALUs supports parallel execution of multiple tasks.

9. An adaptive mechanism according to claim 8, wherein:
the assignment module includes:
  a task selector to select at least two tasks in the plurality of tasks; and
  an ALU selector to select the at least one ALU in the set of available ALUs; and
the assignment module is operative to assign each of the at least two tasks to the at least one ALU in the set of available ALUs.

10. An adaptive mechanism according to claim 9, wherein:
the at least one ALU supports a register large enough to contain data for each of the at least two tasks; and
the assignment module is operative to store data for each of the at least two tasks in the register for the at least one ALU.

11. An adaptive mechanism according to claim 9, wherein each of the at least two tasks includes a similar instruction set.

12. A method, comprising:
receiving a plurality of tasks, each task representing an iteration of an inexact algorithm and including a corresponding iteration power level and a corresponding iteration precision;
identifying a set of available Arithmetic Logic Units (ALUs), each ALU including a corresponding ALU power level and a corresponding ALU precision; and
assigning at least a subset of the plurality of tasks to a subset of the set of available ALUs, wherein a first task in the plurality of tasks is assigned to an ALU with the corresponding ALU precision that is greater than the corresponding iteration precision of the first task,
wherein the assignment of the subset of the plurality of tasks to the subset of the set of available ALUs optimizes a total ALU power used by the subset of the set of available ALUs.

13. A method according to claim 12, wherein
assigning at least a subset of the plurality of tasks to a subset of the set of available ALUs includes:
  selecting a first task in the plurality of tasks with a lowest corresponding iteration power level;
  selecting a first ALU in the set of available ALUs with a lowest corresponding ALU power level and the corresponding ALU precision that is greater than the lowest corresponding iteration precision; and
  assigning the first task in the plurality of tasks to the first ALU in the set of available ALUs with the lowest corresponding ALU power level and the corresponding ALU precision that is greater than the lowest corresponding iteration precision.

14. A method according to claim 13, wherein assigning at least a subset of the plurality of tasks to a subset of the set of available ALUs further includes not assigning a second task in the plurality of tasks to any ALU in the set of available ALUs based at least in part on no ALU in the set of available ALUs including the corresponding ALU precision approximately equivalent to the corresponding iteration precision of the second task.

15. A method according to claim 12, wherein at least one ALU in the set of available ALUs supports parallel execution of multiple tasks.

16. A method according to claim 15, wherein assigning at least a subset of the plurality of tasks to the subset of a set of available ALUs includes:
  selecting at least two tasks in the plurality of tasks;
  selecting the at least one ALU in the set of available ALUs; and
  assigning each of the at least two tasks to the at least one ALU.

17. A method according to claim 16, wherein:
the at least one ALU supports a register large enough to contain data for each of the at least two tasks; and
assigning each of the at least two tasks to the at least one ALU includes storing data for each of the at least two tasks in the register for the at least one ALU.

18. A method according to claim 16, wherein each of the at least two tasks includes a similar instruction set.

19. An article, comprising a non-transitory storage medium, the non-transitory storage medium having stored thereon instructions that, when executed by a machine, result in:
receiving a plurality of tasks, each task representing an iteration of an inexact algorithm and including a corresponding iteration power level and a corresponding iteration precision;
identifying a set of available Arithmetic Logic Units (ALUs), each ALU including a corresponding ALU power level and a corresponding ALU precision; and
assigning at least a subset of the plurality of tasks to a subset of the set of available ALUs, wherein a first task in the plurality of tasks is assigned to an ALU with the corresponding ALU precision that is greater than the corresponding iteration precision of the first task,
wherein the assignment of the subset of the plurality of tasks to the subset of the set of available ALUs optimizes a total ALU power used by the subset of the set of available ALUs.

20. An article according to claim 19, wherein
assigning at least a subset of the plurality of tasks to a subset of the set of available ALUs includes:
  selecting a first task in the plurality of tasks with a lowest corresponding iteration power level;
  selecting a first ALU in the set of available ALUs with a lowest corresponding ALU power level and the corresponding ALU precision that is greater than the lowest corresponding iteration precision; and
  assigning the first task in the plurality of tasks to the first ALU in the set of available ALUs with the lowest corresponding ALU power level and the corresponding ALU precision that is greater than the lowest corresponding iteration precision.

* * * * *